(12) United States Patent
Chevalier et al.

(10) Patent No.: US 12,521,647 B2
(45) Date of Patent: Jan. 13, 2026

(54) METHOD FOR PURIFYING A TARGET SUBSTANCE WITH VIRAL INACTIVATION

(71) Applicant: SARTORIUS CHROMATOGRAPHY EQUIPMENT, Pompey (FR)

(72) Inventors: Jérôme Chevalier, Pournoy la Grasse (FR); Jean-Luc Beulay, Krautergersheim (FR); Thomas Flouquet, Nancy (FR); Hélène Lafontaine, Saizerais (FR)

(73) Assignee: SARTORIUS CHROMATOGRAPHY EQUIPMENT, Pompey (FR)

( * ) Notice: Subject to any disclaimer, the term of this patent is extended or adjusted under 35 U.S.C. 154(b) by 1025 days.

(21) Appl. No.: 17/630,140

(22) PCT Filed: Jul. 24, 2020

(86) PCT No.: PCT/FR2020/051360
§ 371 (c)(1),
(2) Date: Jul. 8, 2022

(87) PCT Pub. No.: WO2021/019167
PCT Pub. Date: Feb. 4, 2021

(65) Prior Publication Data
US 2022/0347598 A1    Nov. 3, 2022

(30) Foreign Application Priority Data
Jul. 26, 2019   (FR) ..................................... 1908574

(51) Int. Cl.
*B01D 15/18* (2006.01)
*B01D 15/36* (2006.01)
(Continued)

(52) U.S. Cl.
CPC ....... *B01D 15/1864* (2013.01); *B01D 15/361* (2013.01); *B01D 15/3804* (2013.01); *B01J 47/026* (2013.01); *B01J 49/85* (2017.01)

(58) Field of Classification Search
CPC .............. B01D 15/1864; B01D 15/361; B01D 15/3804; B01D 15/1871; B01D 15/245;
(Continued)

(56) References Cited

U.S. PATENT DOCUMENTS

| | | |
|---|---|---|
| 8,536,316 B2 | 9/2013 | Soice et al. |
| 9,149,738 B2 | 10/2015 | Skudas |

(Continued)

FOREIGN PATENT DOCUMENTS

| | | |
|---|---|---|
| CN | 101815530 A | 8/2010 |
| CN | 10439534 A | 3/2015 |

(Continued)

OTHER PUBLICATIONS

China National Intellectual Property Administration, Office action issued in CN Application No. 202080063147.9, May 26, 2023, 25 pages.

*Primary Examiner* — Waqaas Ali
(74) *Attorney, Agent, or Firm* — Alleman Hall & Tuttle LLP

(57) ABSTRACT

The invention relates to a method for purifying a target substance starting from a fluid to be treated which comprises at least one impurity. The method comprises treatment of a stream of the fluid to be treated using a chromatography step in a first separation unit, collection of a fraction enriched with the target substance in a first tank, and viral inactivation of the fraction enriched with the target substance. The viral inactivation comprises passing the fraction enriched with the target substance through a second separation unit, passing a viral inactivation solution through the second separation (Continued)

unit, mixing, and collecting the mixture in the second tank to obtain a fraction depleted of active virus. The method further comprises treatment of the fraction depleted of active virus using a chromatography step in the second separation unit and collection of a fraction more enriched with the target substance.

17 Claims, 9 Drawing Sheets

(51) Int. Cl.
*B01D 15/38* (2006.01)
*B01J 47/026* (2017.01)
*B01J 49/85* (2017.01)

(58) Field of Classification Search
CPC .. B01D 15/165; B01D 15/185; B01D 15/203; B01D 15/22; B01D 15/362; B01D 15/363; B01D 15/364; B01J 47/026; B01J 49/85; B01J 47/02; B01J 47/04; B01J 47/12; B01J 47/14; A61L 2/0088; C07K 1/36

See application file for complete search history.

(56) References Cited

U.S. PATENT DOCUMENTS

| | | |
|---|---|---|
| 9,527,010 B2 | 12/2016 | Williams et al. |
| 2014/0255994 A1 | 9/2014 | Konstantinov et al. |
| 2015/0064769 A1 | 3/2015 | Xenopoulos |

FOREIGN PATENT DOCUMENTS

| | | | | |
|---|---|---|---|---|
| EP | 2682168 A1 * | 1/2014 | ............... | C07K 1/36 |
| EP | 2763771 B1 | 8/2014 | | |
| EP | 3130384 A1 | 2/2017 | | |
| WO | 2009045897 A1 | 4/2009 | | |
| WO | 2011017514 A1 | 2/2011 | | |
| WO | 2012014183 A1 | 2/2012 | | |
| WO | 2012078677 A2 | 6/2012 | | |
| WO | 2013050104 A1 | 4/2013 | | |
| WO | 2018122196 A1 | 7/2018 | | |

* cited by examiner

METHOD FOR PURIFYING A TARGET SUBSTANCE WITH VIRAL INACTIVATION

FIELD OF THE INVENTION

This invention concerns a chromatographic method for purifying a target substance comprising a viral inactivation.

PRIOR ART

Antibodies and other substances are typically produced by cell culture (bacterial or eukaryotic cells). The substances of interest thus produced must then be purified by various techniques in order to eliminate the impurities present in the production environment. To this end, these substances, and antibodies in particular, are traditionally subjected to a capture step, e.g. by affinity chromatography, and one or more polishing steps, e.g. by ion exchange chromatography. The purification methods also often include a viral inactivation step.

For example, document U.S. Pat. No. 9,149,738 discloses a method for purifying a molecule using at least three separation units connected with one another in a circle and containing an affinity or ion exchange matrix, in which, cyclically, a first column is loaded with the sample to be purified whilst in fluidic communication with the second column, whilst, at the same time, the third column is eluted and regenerated. The purified molecule may then be subjected to a step of viral inactivation by exposure to an acidic pH online or using a buffer reservoir, followed by a flow-through chromatography step.

Document WO 2012/078677 describes a continuous method for purifying a biomolecule comprising a step of capture and a step of viral inactivation, in which the flow of the capture step is collected in a receptacle in which its pH is adjusted by titration with acid. The solution is then left for the time required for inactivation and then transferred to another receptacle, in which its pH is readjusted for transfer to the following unit, such as a cation exchange chromatography column.

Documents EP 2763771 and U.S. Pat. No. 8,536,316 describe purification methods wherein the viral inactivation is carried out by passing a viral inactivation buffer over a column after the latter has been loaded with the sample to be treated and before the elution of the molecule of interest. In other methods, such as those described in document WO 2009/045897, the viral inactivation is carried out by eluting the molecule of interest, retained on a first chromatography column, under acidic conditions and by keeping the acidic eluate in a reservoir for a certain amount of time.

Document EP 3130384 describes a method for purifying a molecule comprising a bind-and-elute chromatography step and a flow-through purification step (activated charcoal, anion exchange chromatography, and cation exchange chromatography). The bind-and-elute chromatography step may be followed by viral activation in which a viral inactivation agent is introduced online into a connection line comprising a static mixer, or using a buffer reservoir.

Document U.S. Pat. No. 9,527,010 describes a system for purifying biomolecules comprising two chromatography devices connected in series, a sensor coupled with the conduit connecting the two chromatography devices measuring a property such as pH, conductivity, or concentration of a species, a device allowing for the injection of a fluid into the conduit connecting the two chromatography devices as a function of the value of the property, as well as a filter to eliminate viruses downstream of the second chromatography device.

There is a need for an effective purification method comprising viral inactivation that can be implemented in a single installation and be controlled by a single computer program, thus allowing for an installation of reduced overall size, faster purification, and better purification quality.

SUMMARY OF THE INVENTION

Firstly, the invention concerns a method for purifying a target substance from a fluid to be treated comprising at least one impurity in an installation comprising:
 a first separation unit comprising at least one chromatography column, a fluid inlet, and a fluid outlet;
 a second separation unit comprising at least a chromatography column, a fluid inlet, a fluid outlet, and a bypass line bypassing the at least one chromatography column of the second separation unit;
 a first reservoir in fluid connection with a fluid outlet of the first separation unit and a fluid inlet of the second separation unit; and
 a second reservoir in fluid connection with at least a fluid inlet and a fluid outlet of the second separation unit;
 wherein the method comprises the following steps:
 providing a flow of fluid to be treated;
 treating the flow of fluid to be treated by means of a chromatography step in the first separation unit;
 collecting a fraction enriched in the target substance in the first reservoir;
 viral inactivation of the fraction enriched in the target substance, wherein the viral inactivation comprises:
  passing the fraction enriched in the target substance collected in the first reservoir through the second separation unit via the bypass line;
  passing a viral inactivation solution through the second separation unit via the bypass line;
  mixing the fraction enriched in the target substance and the viral inactivation solution; and
  collecting the mixture of the fraction enriched in the target substance and the viral inactivation solution in the second reservoir;
 so as to obtain a fraction depleted of active virus;
 treating the fraction depleted of active virus by means of a chromatography step in the second separation unit; and
 collecting a fraction more enriched in the target substance at the outlet of the second separation unit.

In some embodiments, the treatment of the flow of fluid to be treated by means of a chromatography step in the first separation unit is an affinity chromatography treatment.

In some embodiments, the treatment of the fraction depleted of active virus by means of a chromatography step in the second separation unit is a treatment by ion exchange chromatography, preferably a treatment by anion exchange chromatography. In some embodiments, the step of passing the fraction enriched in the target substance collected in the first reservoir through the second separation unit via the bypass line and the step of passing a viral inactivation solution through the second separation unit via the bypass line are simultaneous, wherein the step of mixing the fraction enriched in the target substance and the viral inactivation solution is carried out online in the bypass line of the second separation unit.

In some embodiments, the step of passing the fraction enriched in the target substance collected in the first reservoir through the second separation unit via the bypass line and the step of passing a viral inactivation solution through the second separation unit via the bypass line are successive, wherein the step of mixing the fraction enriched in the target substance and the viral inactivation solution is carried out in the second reservoir.

In some embodiments, the mixture of the fraction enriched in the target substance and the viral inactivation solution collected in the second reservoir is stored in the second reservoir for at least 15 min, preferably for a duration of from 20 to 45 min, more preferably with stirring.

In some embodiments, the viral inactivation of the fraction enriched in the target substance further comprises:

a) passing the mixture of the fraction enriched in the target substance and the viral inactivation solution collected in the second reservoir through the second separation unit via the bypass line;

b) collecting the mixture at the outlet of the second separation unit in the second reservoir;

wherein steps a) and b) are optionally repeated one or more times or carried out continuously; and c) optionally storing the mixture in the second reservoir, preferably with stirring; wherein the steps a) and b), which are optionally repeated or optionally carried out continuously, and the optional step c) taken together are preferably carried out for a duration of at least 15 min, more preferably for a duration of from 20 to 45 min.

In some embodiments, the second separation unit further comprises a pH sensor and/or a temperature sensor, preferably an online sensor, wherein the viral inactivation of the fraction enriched in the target substance further comprises measuring and optionally adjusting the pH and/or temperature of the mixture of the fraction enriched in the target substance and the viral inactivation solution passing through the second separation unit.

In some embodiments, the viral inactivation solution is an acidic solution.

In some embodiments, the mixture of the fraction enriched in the target substance and the acidic solution has a pH less than or equal to 5, preferably less than or equal to 4.

In some embodiments, the method comprises a step of adding a basic solution to the fraction depleted of active virus before the step of treating the fraction depleted of active virus by means of a chromatography step in the second separation unit.

In some embodiments, the addition of the basic solution to the fraction depleted of active virus is carried out online in the second separation unit.

In some embodiments, the addition of the basic solution to the fraction depleted of active virus is carried out in the second reservoir, preferably by passing the basic solution through the second separation unit via the bypass line.

In some embodiments, the method comprises at least one step of rinsing the second separation unit, wherein a rinse buffer is passed through the second separation unit via the bypass line, preferably after the step of viral inactivation of the fraction enriched in the target substance, and/or before the step of treating the fraction depleted of active virus by means of a chromatography step in the second separation unit, and/or after the step of treating the fraction depleted of active virus by means of a chromatography step in the second separation unit.

In some embodiments, the installation further comprises a third separation unit comprising at least a chromatography column, a fluid inlet, and a fluid outlet, wherein a fluid inlet is in fluid connection with a fluid outlet of the second separation unit;

wherein the method further comprises the following steps:

treating the fraction more enriched in the target substance by means of a chromatography step in the third separation unit; and collecting a purified fraction of the target substance at the outlet of the third separation unit.

In some embodiments, the treatment of the fraction more enriched in the target substance by means of a chromatography step in the third separation unit is a treatment by ion exchange chromatography, preferably a treatment by cation exchange chromatography.

In some embodiments, the fluid to be treated is a cell culture supernatant.

In some embodiments, the target substance is an antibody.

In some embodiments, the first separation unit is a multi-column unit.

The invention also concerns a computer program comprising program code instructions for executing the steps of the method as described above when the program is run on a computer.

The invention also concerns a computer-readable storage medium on which a computer program as described above is stored.

The invention also concerns a system comprising a processor coupled to a memory on which a computer program as described above is stored.

This invention allows for the need described above to be met. More specifically, it provides a method for purifying a target substance with viral inactivation allowing for the use of a smaller purification system and faster, more effective purification.

This is accomplished by implementing the viral inactivation step by means of the second separation unit via a line bypassing the separation devices (e.g. the columns). This bypass line has the advantage of operating larger flows (for example a mixture of the product containing the target substance with a viral inactivation solution) than a standard chromatography unit. This makes it possible to avoid using another, different installation to carry out the viral inactivation. Thus, the purification method may be implemented entirely in a single installation, controlled by a single piece of software, allowing gains in space and time as well as better purification quality.

Additionally, compared to a method in which the viral inactivation is carried out on a column, in particular an affinity chromatography column, on which the product to be treated has been loaded, by eluting the molecule of interest with a viral inactivation solution such as an acidic solution, the method according to the invention makes it possible for the viral inactivation solution not to be passed through the chromatography column. Passing the viral inactivation solution through a chromatography column is disadvantageous because the column must be carefully rinsed afterwards.

Furthermore, the product volumes treated by the first separation unit (e.g. an affinity chromatography unit) are generally greater than the volumes treated by the subsequent separation unit (e.g. an ion exchange chromatography unit). This is due to the fact that, during separation in the first separation unit, some of the impurities contained in the initial product to be treated are eliminated, thus reducing the volume of the fraction collected at the outlet of the first separation unit compared to the volume of the initial product. When the viral inactivation is carried out on the affinity chromatography columns of the first separation unit (by passing the viral inactivation solution directly through the columns), said affinity chromatography columns are no longer available to carry out the separation for the entire duration of the viral inactivation. The method according to the invention allows time to be saved compared to such a method because the first separation unit can be used without interruption due to viral inactivation, with the viral inactivation step being carried out during the downtime of the second separation unit due to the smaller volume of product treated in the second separation unit.

DETAILED DESCRIPTION

Figure 1:
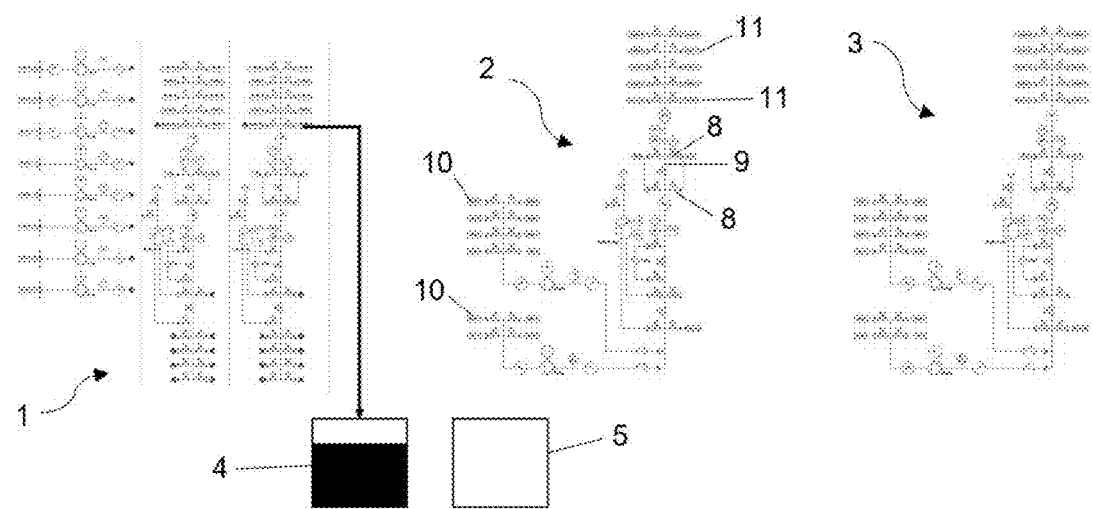
FIG. 1 shows one step of the purification method according to a first, second, and third embodiment.

The invention will now be described in greater detail and without limitation in the following description.

The invention concerns a method for purifying a target substance from a fluid to be treated.

Fluid to be Treated

The target substance may, in particular, be any molecule or macromolecule, but is preferably a biological molecule or macromolecule. More preferably, the target substance is a protein or glycoprotein. In particular, the target substance may be a recombinant protein such as an antibody or a viral vector.

Within the meaning of this invention, the term "antibody" includes complete antibodies and fragments or derivatives thereof, such as fusion proteins comprising an antibody fragment (such as an Fc fragment), provided that they contain a binding domain specific to a ligand. Antibodies may be monoclonal or polyclonal, monomeric or polymeric, monospecific or multispecific (e.g. bispecific).

Examples of antibodies include human antibodies, in particular IgGs (such as IgG1, IgG2, IgG3, and IgG4), IgM, IgA (such as IgA1, and/or IgA2), IgD, and IgE, canine antibodies, and in particular IgGA, IgGB, IgGC, and IgGD, chicken antibodies, in particular IgA, IgD, IgE, IgG, IgM, and IgY, goat antibodies, in particular IgG, murine antibodies, in particular IgG, IgD, IgE, and IgM, porcine antibodies, in particular IgG, IgD, IgE, and IgM, rat antibodies, in particular IgG, IgD, IgE, and IgM, chimeric antibodies, humanised antibodies, as well as fragments or derivatives thereof.

Examples of fragments include Fab, Fab', F(ab')2, Fc, and Fv fragments.

The substance to be treated may also be a mixture of the aforementioned substances.

The fluid to be treated contains the target substance to be purified and one or more impurities. Preferably, the fluid to be treated is a cell culture supernatant. Alternatively, the fluid to be treated may be a cell culture fluid, comprising for example cells and/or insoluble cell debris, or an enzymation broth.

The impurities present in the fluid to be treated may comprise host cell proteins (HCP), DNA, and/or DNA fragments, RNA and/or RNA fragments, microorganisms, viruses, endotoxins, lipids, components of the cell culture medium, or a mixture thereof.

The fluid to be treated preferably comprises viruses. The method according to the invention allows for their inactivation.

The fluid to be treated may have undergone clarification as a pretreatment. The clarification step consists of reducing or eliminating suspended matter. It may be carried out, e.g., by means of filtration using a pocket or spool filter, basket filter, or filter press, centrifugation, decanting, earth filtration with or without pre-coatings and/or nutrition, dead-end filtration, or tangential filtration on a microfiltration or ultrafiltration membrane, or filtration on diatomaceous earth or a ceramic membrane, or filtration on activated charcoal, or precipitation.

Installation and General Purification Method

The method according to the invention is implemented in an installation comprising:
  a first separation unit comprising at least one fluid inlet and at least one fluid outlet;
  a second separation unit comprising at least one fluid inlet and at least one fluid outlet;
  a first reservoir; and
  a second reservoir.

The first separation unit may be, e.g., a chromatography unit, including chromatography columns and/or chromatography membranes, but also a filtration, centrifugation, or precipitation unit. The first separation unit comprises at least one separation device.

Preferably, the first separation unit is a chromatography unit, and comprises one or more chromatography columns and/or chromatography membranes as separation devices. If several columns and/or membranes are present, they may all be connected serially, in parallel, or the separation unit may comprise certain columns and/or membranes that are connected serially and certain columns and/or membranes that are connected in parallel. Preferably, the first separation unit is a multi-column unit, i.e. it comprises at least two columns.

The chromatography column(s) and/or membrane(s) of the first separation unit contain a stationary phase. Preferably, all columns and/or membranes of the first separation unit have an identical stationary phase. Alternatively, the columns and/or membranes may have different stationary phases.

The stationary phase is preferably an affinity chromatography resin. Suitable chromatography resins for the first separation unit are resins having protein A, protein G, protein L ligands, and/or functional variants thereof.

The stationary phase of the columns and/or membranes of the first separation unit may also be an ion exchanger resin, such as a cationic resin, a mixed-mode cationic resin, an anionic resin, a mixed-mode anionic resin, strong, or weak mode, or a mixture thereof, or a hydrophobic interaction chromatography resin, or a size-exclusion resin.

As separation devices, the filtration unit may comprise one or more sterile filters, charcoal filters, tangential or frontal circulation membranes, and/or virus retention filters.

A fluid inlet of the first separation unit is preferably in fluid connection with a reservoir containing the fluid to be treated. Other reservoirs may also be in fluid connection with a fluid inlet of the first separation unit, e.g. a reservoir containing an eluant. Pumps may be present in order to bring the various fluids to the first separation unit.

By "fluid connection" between two devices or parts of devices is meant that the devices or parts of devices are connected to one another via a connection line allowing a fluid to flow from one device to another. This connection line may be direct or interrupted by one or more elements such as valves, separation units, or any other element of the installation. A fluid connection may be permanent, i.e. a fluid flows permanently in the connection line, or non-permanent, i.e. the flow in the connection line may be stopped and resumed, e.g. by means of a valve present on the connection line. When a fluid is actually flowing from one device to another (or one part of a device to another), the two devices (or parts of devices) are in "fluid communication".

A flow of the fluid to be treated is subjected to a separation step, preferably a chromatography step, in the first separation unit. More preferably, the chromatography is affinity chromatography. Alternatively, it may be ion exchange chromatography such as anion or cation exchange chromatography, hydrophobic interaction chromatography, or size exclusion chromatography. The implementation of these chromatography steps is well known to persons skilled in the art.

Alternatively, the separation step is a filtration, centrifugation, or precipitation step.

Upon exiting this separation step (e.g. chromatography step), a fraction enriched in the target substance and a fraction enriched in impurities are obtained.

"Fraction enriched in the target substance" refers to a fraction in which the ratio of the molar concentrations of the target substance to total impurities is greater than that of the flow entering the separation (e.g. at the chromatography inlet). Likewise, a "fraction enriched in impurities" refers to a fraction in which the ratio of the molar concentrations of the target substance to total impurities is less than that of the flow entering the separation (e.g. at the chromatography inlet).

A fluid outlet of the first separation unit is in fluid connection with the first reservoir, and the fraction enriched in the target substance is collected in the first reservoir.

The first reservoir is in fluid connection with a fluid inlet of the second separation unit.

The first reservoir preferably has a storage capacity greater than or equal to the volume received from the first separation unit from an entire production cycle. The volume of an entire production cycle corresponds to the volume of the fraction enriched in the target substance from the first separation unit. This storage capacity may be divided into several first reservoirs.

The second separation unit may be, e.g., a chromatography unit, including chromatography columns and/or chromatography membranes, but also a filtration, centrifugation, or precipitation unit. The second separation unit comprises at least one separation device.

Preferably, the second separation unit is a chromatography unit, and comprises at least one chromatography column and/or chromatography membrane as separation devices. If several columns and/or membranes are present, they may all be connected serially, in parallel, or the separation unit may comprise certain columns and/or membranes that are connected serially and certain columns and/or membranes that are connected in parallel.

The chromatography column(s) and/or membrane(s) of the second separation unit contain a stationary phase. Preferably, all columns and/or membranes of the second separation unit have an identical stationary phase. Alternatively, the columns and/or membranes may have different stationary phases.

Preferably, the second separation unit comprises a single chromatography column or membrane.

The stationary phase is preferably an ion exchange resin. More preferably, it is an anion exchange resin or a mixed-mode anion exchange resin. Alternatively, it may be a cation exchange resin or a mixed-mode cation exchange resin. In other embodiments, the stationary phase may be activated charcoal.

As separation devices, the filtration unit may comprise one or more sterile filters, charcoal filters, tangential or frontal circulation membranes, and/or virus retention filters.

The second separation unit also comprises a bypass line. This bypass line allows for the separation device, e.g. the one or more chromatography columns and/or membranes, of the second unit, to be bypassed (or short-circuited). When the second separation unit comprises several columns and/or membranes, the bypass line bypasses all of the columns and/or membranes of the second separation unit. In other words, when a fluid passes through the second separation unit via this bypass line, the fluid does not pass through the separation device (e.g. the chromatography column(s) and/or membrane(s)) of the second separation unit. The bypass line is connected to at least one fluid inlet of the second separation unit at one of its ends and at least one fluid outlet of the second separation unit at the other of its ends.

An outlet of the second separation unit is in fluid connection with the second reservoir. At least one fluid inlet of the second separation unit is also in fluid connection with the second reservoir.

The second reservoir has a storage capacity greater than or equal to the volume of the first reservoir(s). This storage capacity may be divided into several second reservoirs.

Preferably, the fluid inlet(s) of the second separation unit are in fluid connection with one or more reservoirs, e.g. a reservoir of viral inactivation solution (e.g. an acidic solution), a basic solution reservoir, one or more rinse buffer reservoirs, and/or one eluant reservoir; preferably, each reservoir is in fluid connection with a different fluid inlet of the second separation unit. The fluids contained in these reservoirs, or in the first and second reservoirs, may be brought to the second separation unit by one or more pumps.

The fraction collected in the first reservoir is then subjected to a viral inactivation step.

This viral inactivation step includes:
  passing the fraction enriched in the target substance collected in the first reservoir through the second separation unit via the bypass line.
  passing a viral inactivation solution through the second separation unit via the bypass line;
  mixing the fraction enriched in the target substance and the viral inactivation solution; and
  collecting the mixture of the fraction enriched in the target substance and the viral inactivation solution in the second reservoir.

In this step, neither the fraction enriched in the target substance, nor the viral inactivation solution passes through the separation device (e.g. the chromatography column(s)) of the second separation unit.

Advantageously, the viral inactivation solution is an acidic solution. Alternatively or additionally, the inactivation solution may comprise another viral inactivation agent, e.g. a detergent such as Triton X-100.

The passages of the fraction enriched in the target substance and the viral inactivation solution through the second separation units may be simultaneous or successive.

When the passages are simultaneous (or concomitant), the fraction enriched in the target substance and the viral inactivation solution are mixed online in the second separation unit, in particular in the bypass line. At the outlet of the second separation unit, the mixture is then collected in the second reservoir.

Within the meaning of this invention, "online mixing" means that the mixing takes place in a conduit or line of the separation unit. An online mixing does not take place in a reservoir or a tank.

When the passages are successive, the passage of the viral inactivation solution is preferably carried out after the passage of the fraction enriched in the target substance. The fraction enriched in the target substance and the viral inactivation solution are then each collected in the second reservoir at the outlet of the second separation unit. The fraction enriched in the target substance and the viral inactivation solution are mixed in the second reservoir.

The purpose of adding the viral inactivation solution to the fraction enriched in the target substance is to inactivate all or part of the viruses that may be present. "Inactivating a virus" refers to suppressing the biological activity of the virus, in particular its infectivity. On the other hand, an "active virus" is a virus that maintains its biological activity, in particular its infectivity. When the viral inactivation solution is an acidic solution, the purpose of adding the acidic solution to the fraction enriched in the target substance is to adjust the pH of the mixture to a pH low enough to inactivate all or part of the viruses that may be present. Preferably, the pH of the mixture of the fraction enriched in the target substance and the acidic solution is less than or equal to 5, more preferably less than or equal to 4, even more preferably from 3 to 3.8, e.g. from 3 to 3.2, or from 3.2 to 3.4, or from 3.4 to 3.6, or from 3.6 to 3.8, or from 3.8 to 4, or from 4 to 4.5, or from 4.5 to 5.

The acidic solution preferably has a pH of between 3 and 5. Examples of acidic solutions that can be used in the method according to the invention include an acetic acid and/or caprylic acid solution.

The fraction enriched in the target substance must remain in contact with the viral inactivation solution for a certain period of time in order for the viral inactivation to be effective. For example, when the viral inactivation solution is an acidic solution, the mixture of the fraction enriched in the target substance and the acidic solution must be kept at a pH as defined above for a certain duration in order for the viral inactivation to take effect. Preferably, this duration is at least 5 min, more preferably at least 15 min, more preferably from 20 to 45 min, even more preferably from 25 to 35 min. In some embodiments, the duration is from 5 to 10 min, from 10 to 15 min, from 15 to 20 min, from 20 to 25 min, from 25 to 30 min, from 30 to 35 min, from 35 to 40 min, or from 40 to 45 min.

In some embodiments, the mixture of the fraction enriched in the target substance and the viral inactivation solution collected in the second reservoir is stored in the second reservoir for the aforementioned duration.

In some embodiments, the mixture of the fraction enriched in the target substance and the viral inactivation solution collected in the second reservoir undergoes the following steps:
  a) the mixture of the fraction enriched in the target substance and the viral inactivation solution passes through the second separation unit via the bypass line;
  b) at the outlet of the second separation unit, the mixture is collected in the second reservoir;
steps a) and b) may optionally be repeated one or more times, or carried out continuously for a certain duration; and
  c) optionally, the mixture is stored in the second reservoir.

The sequence of the steps a) and b), the potential repetition of the steps a) and b), the potential continuous implementation of the steps a) and b), and the optional step c) preferably has a duration as set forth above.

Advantageously, the second reservoir comprises means of stirring, e.g. mechanical rotary shakers (e.g. when the reservoir is reusable) or magnetically driven stirrers (e.g. in the case of a single-use reservoir). Preferably, the mixture is stored in the second reservoir under stirring.

The second separation unit may comprise at least one sensor.

Advantageously, the sensor is an online sensor. Within the meaning of this invention, "online sensor" means a sensor positioned on a conduit or line of the separation unit. The term "online sensor" also includes a bypass sensor with sampling on a conduit or line of the separation unit.

Preferably, the sensor is a pH sensor, a temperature sensor, a conductivity sensor, a densimeter, a polarimeter, a refractometer an infrared, near-infrared, Raman, or UV/visible spectrometer, or an online NMR device. Several detectors may be present, preferably selected from those listed above.

Advantageously, the second separation unit comprises a pH sensor and/or a temperature sensor.

These detectors may allow for the measurement of a parameter such as pH, temperature, conductivity, density, optical rotation, refractive index, absorbance, or emission of spectroscopic radiation, or nuclear magnetic resonance of the fluids passing through the second separation unit, and in particular the mixture of the fraction enriched in the target substance and the viral inactivation solution.

Particularly advantageously, the measurement of pH and/or temperature and/or another parameter such as those set forth above is carried out on the mixture of the fraction enriched in the target substance and the viral inactivation solution passing through the second separation unit. Even more preferably, this measurement is taken upon each passage of the mixture of the fraction enriched in the target substance and the viral inactivation solution through the second separation unit or continuously when the mixture continuously passes through the second separation unit. This is particularly advantageous when the above steps a) and b) are carried out continuously or repeated one or more times. Thus, if the value of the parameter measured (such as the pH and/or the temperature) deviates from the desired value of said parameter, the latter can be adjusted. For example, the pH may be adjusted by adding an acidic solution (which may be the same as the viral inactivation solution) or a basic solution to the second separation unit via the bypass line, such that it mixes with the mixture of the fraction enriched in the target substance and the viral inactivation solution.

Alternatively or additionally, the second reservoir may comprise a sensor. The nature of the sensor may be as described above. These detectors may allow for the measurement of a parameter such as pH, temperature, conductivity, density, optical rotation, refractive index, absorbance, or emission of spectroscopic radiation, or nuclear magnetic resonance of the fluids contained in the second reservoir, and in particular the mixture of the fraction enriched in the target substance and the viral inactivation solution.

Advantageously, the second reservoir comprises a pH sensor and/or a temperature sensor.

A measurement of pH and/or temperature and/or another parameter such as those set forth above may be carried out on the mixture of the fraction enriched in the target substance and the viral inactivation solution contained in the second reservoir. This is particularly advantageous when the mixture is formed and/or stored in the second reservoir. Thus, if the value of the parameter measured (such as the pH and/or the temperature) deviates from the desired value of said parameter, the latter can be adjusted. For example, the pH of the mixture may be adjusted by injecting an acidic solution (which may be the same as the viral inactivation solution) or a basic solution to the second reservoir by passing it through the second separation unit via the bypass line.

Following the viral inactivation step, a fraction depleted of active virus is obtained. "Fraction depleted of active virus" refers to a fraction in which the ratio of the molar concentrations of active viruses to total viruses is less than that of the fraction before the viral inactivation step. Preferably, the fraction depleted of active virus is substantially devoid of active virus.

Advantageously, the second separation unit is rinsed after the viral inactivation step by passing a rinse buffer through the second separation unit via the bypass line. During this rinsing step, the fraction depleted of active virus is stored in the second reservoir. Preferably, the second separation unit is not in fluid communication with the second reservoir during this rinsing step, and the rinse buffer, after passing through the bypass line, is preferably eliminated from the installation by being directed to a waste collection line. However, the second separation unit may be in fluid communication with the second reservoir during rinsing, preferably for only part of the rinsing process, more preferably during an initial part of the rinsing process. This allows for the mixture of the fraction enriched in the target substance and the viral inactivation solution remaining in the second separation unit to be collected in the second reservoir. The decision of whether to direct the rinse buffer, after its passage through the bypass line, to a waste collection line or towards the second reservoir may be taken based on whether a desired pH or conductivity level has been reached, or whether a certain volume of rinse buffer has passed, or based on timing.

All rinsing processes described herein may be carried out by means of a rinse buffer that may be purified water or water for injection, with or without added salt. Additionally, for all rinsing processes described herein, a parameter of the rinse buffer, e.g. its pH, may be measured by a sensor placed in the second separation unit, preferably an online sensor. The flow rate and/or input volume of the rinse buffer during these rinsing processes may then be modified depending on the value measured (e.g. depending on the measured pH).

Preferably, a basic solution is added to the fraction depleted of active virus, in particular in the embodiments in which the viral inactivation solution is an acidic solution. This allows for the pH of the fraction to be adjusted to a pH suited for the subsequent operations.

The basic solution preferably has a pH of between 7 and 9. Examples of basic solutions that can be used in the method according to the invention include soda solution and/or monosodium phosphate ($NaH_2PO_4$) solution.

In some embodiments, the basic solution is added to the fraction depleted of active virus online in the second separation unit. Within the meaning of this invention, "online addition" means that the addition takes place in a conduit or line of the separation unit. Online addition does not take place in a reservoir or a tank. In these embodiments, the basic solution and the fraction depleted of active virus (contained in the second reservoir) pass through the second separation unit simultaneously, such that they mix in the second separation unit.

In other embodiments, the basic solution is added to the fraction depleted of active virus in the second reservoir. Preferably, in these embodiments, the basic solution is added to the fraction depleted of active virus by passing through the second separation unit via the bypass line, with the second separation unit being in fluid communication with the second reservoir, which contains the fraction depleted of active virus.

One or more parameters of the mixture of the basic solution and the fraction depleted of active virus, such as the pH, temperature, conductivity, density, optical rotation, refractive index, absorbance, or emission of spectroscopic radiation or nuclear magnetic resonance; preferably the pH and/or temperature, may be measured by one or more sensors placed in the second separation unit, with the sensor preferably being an online detector and/or placed in the second reservoir. Thus, if the value of the parameter measured (such as the pH and/or the temperature) deviates from the desired value of said parameter, the latter can be adjusted. For example, the pH may be adjusted by adding the basic solution or an acidic solution in the second separation unit via the bypass line, such that it mixes with the mixture of the basic solution and the fraction depleted of active virus.

The fraction depleted of active virus is then treated by a separation (e.g. chromatography) step in the second separation unit. Rinsing may be carried out in the second separation unit before this separation (e.g. chromatography) step by passing a rinse buffer through the second separation unit via the bypass line. During this rinsing step, the second separation unit is preferably not in fluid communication with the second reservoir. The rinse buffer, after having passed through the bypass line, may be eliminated from the installation (by directing it to a waste collection line).

When a basic solution is added to the fraction depleted of active virus prior to or simultaneously with this separation (e.g. chromatography) step, and when it is added online in the second separation unit (with the fraction depleted of active virus and the basic solution being simultaneously passed through the second separation unit), the fraction depleted of active virus to which the basic solution has been added may pass directly through the separation device(s) (e.g. the chromatography column(s)) of the second separation unit in order to undergo the separation treatment, e.g. the chromatographic treatment (in such cases, the fraction does not pass through the bypass line). Alternatively, when the basic solution is added online in the second separation unit (with the fraction depleted of active virus and the basic solution being simultaneously passed through the second separation unit), the fraction depleted of active virus to which the basic solution was added may pass through the bypass line of the second separation unit, with a fluid outlet of the second separation unit being in fluid communication with the second reservoir, and be collected in the second reservoir. In this case, the fraction depleted of active virus and the basic solution are mixed in the bypass line. A rinse buffer may advantageously then be passed through the second separation unit via the bypass line, with a fluid outlet of the second separation unit being in fluid communication with the second reservoir, in order to collect the fraction depleted of active virus to which the basic solution was added that has remained in the second separation unit in the second reservoir. The fraction collected in the second reservoir is then passed through the second separation unit to undergo the separation (e.g. chromatography) step.

The separation step is preferably a chromatography step, but it may alternatively be a filtration, centrifugation, or precipitation step.

Advantageously, the volume of the fraction depleted of active virus treated by the separation step in the second separation unit is smaller than the volume of the fluid flow treated by the separation step in the first separation unit, for a given initial volume of flow to be treated. In these embodiments, the separation in the second separation unit is thus preferably faster than the separation in the first separation unit (for a given initial volume of flow to be treated). Thus, when the separation steps in the first separation unit and the second separation unit are carried out continuously, i.e. at least partially at the same time, the method necessarily includes times in which the second separation unit is not used to carry out a separation (also known as "downtime of the separation unit"). The method according to the invention has the advantage that this downtime of the second separation unit is taken advantage of in order to carry out the viral inactivation. This allows for time to be saved compared to a method in which the viral inactivation is carried out on the column(s) of the first separation unit (thus prolonging the downtimes of the first separation unit and the second separation unit).

Preferably, the chromatography is ion exchange chromatography, more preferably anion exchange chromatography or mixed-mode anion exchange chromatography. It may also be cation exchange chromatography, mixed-mode cation exchange chromatography, or activated charcoal chromatography. The implementation of these chromatography steps is well known to persons skilled in the art.

Upon exiting this separation (e.g. chromatography) step, a fraction more enriched in the target substance and another fraction enriched in impurities are obtained.

"Fraction more enriched in the target substance" refers to a fraction in which the ratio of the molar concentrations of the target substance to total impurities is greater than that of the flow entering the separation, e.g. at the chromatography inlet (corresponding to the ratio of concentrations in the fraction enriched in the target substance). Likewise, the other "fraction enriched in impurities" refers to a fraction in which the ratio of the molar concentrations of the target substance to total impurities is less than that of the flow entering the separation (e.g. at the chromatography inlet).

Particularly advantageously, the installation according to the invention comprises a third separation unit.

The third separation unit comprises at least one fluid inlet and at least one fluid outlet, with a fluid inlet of the third separation unit being in fluid connection with an outlet of the second separation unit.

The third separation unit may be, e.g., a chromatography unit, including chromatography columns and/or chromatography membranes, or a filtration, centrifugation, or precipitation unit. The third separation unit comprises at least one separation device.

Preferably, the third separation unit is a chromatography unit, and comprises at least one chromatography column and/or chromatography membrane as separation devices. If several columns and/or membranes are present, they may all be connected serially, in parallel, or the separation unit may comprise certain columns and/or membranes that are connected serially and certain columns and/or membranes that are connected in parallel.

The chromatography column(s) and/or membrane(s) of the third separation unit contain a stationary phase. Preferably, all columns and/or membranes of the third separation unit have an identical stationary phase. Alternatively, the columns and/or membranes may have different stationary phases.

Preferably, the third separation unit comprises a single chromatography column or membrane.

The stationary phase is preferably an ion exchange resin. More preferably, it is a cation exchange resin. Alternatively, it may be a mixed-mode cation exchange resin, an anion exchange resin, or a mixed-mode anion exchange resin. In other embodiments, the stationary phase may be activated charcoal.

Preferably, the fluid inlet(s) of the third separation unit are in fluid connection with one or more reservoirs, e.g. one or more rinse buffer reservoirs and/or an eluant reservoir; preferably, each reservoir is in fluid connection with a different fluid inlet of the third separation unit. The fluids contained in these reservoirs may be supplied to the third separation unit by one or more pumps.

Advantageously, the fraction more enriched in the target substance collected at the outlet of the second separation unit undergoes treatment by a chromatography step in the third separation unit.

Preferably, the chromatography is ion exchange chromatography, more preferably cation exchange chromatography. It may also be mixed-mode cation exchange chromatography, anion exchange chromatography, mixed-mode anion exchange chromatography, or activated charcoal chromatography. The implementation of these chromatography steps is well known to persons skilled in the art.

A purified fraction of the target substance is collected at the outlet of the third separation unit.

"Purified fraction of the target substance" refers to a fraction in which the ratio of the molar concentrations of the target substance to total impurities is greater than that of the flow entering the separation, e.g. at the chromatography inlet (corresponding to the ratio of concentrations in the fraction more enriched in the target substance).

Advantageously, the second separation unit is rinsed after the chromatography step in the second separation unit by passing a rinse buffer through the second separation unit via the bypass line. During this rinsing step, the second separation unit is preferably not in fluid communication with the second reservoir; preferably, it is in fluid communication with a waste collection line so as to eliminate the rinse buffer from the installation.

The method according to the invention is preferably a semi-continuous method, i.e. at least some of the steps of the method are at least partially carried out simultaneously and at least some of the steps of the method are carried out when the previous step of the method has ended. Advantageously, the separation (preferably, chromatography) step in the first separation unit is at least partially carried out simultaneously with the separation (preferably, chromatography) step in the second separation unit.

The separation units and the reservoirs may each be reusable or single-use equipment.

Method and Installation with One Reservoir

The invention also concerns a purification method as described above, in which a single reservoir is used in lieu of a first and second reservoir.

The method according to the invention then uses an installation comprising one reservoir, which is in fluid connection with a fluid outlet of the first separation unit and at least a fluid inlet and a fluid outlet of the second separation unit.

In some embodiments, the invention concerns a method for purifying a target substance from a fluid to be treated comprising at least one impurity in an installation comprising:
- a first separation unit comprising at least a separation device (e.g. at least one chromatography column), a fluid inlet, and a fluid outlet;
- a second separation unit comprising at least a separation device (e.g. at least one chromatography column), a fluid inlet, a fluid outlet, and a bypass line bypassing the at least one separation device (e.g. the at least one chromatography column) of the second separation unit; and
- a reservoir in fluid connection with a fluid outlet of the first separation unit and with at least a fluid inlet and a fluid outlet of the second separation unit;

wherein the method comprises the following steps:
providing a flow of fluid to be treated;
treating the flow of fluid to be treated by means of a separation (e.g. chromatography) step in the first separation unit;
collecting a fraction enriched in the target substance in the reservoir;
viral inactivation of the fraction enriched in the target substance, wherein the viral inactivation comprises:
passing a viral inactivation solution (e.g. an acidic solution) through the second separation unit via the bypass line;
mixing the fraction enriched in the target substance and the viral inactivation solution; and
collecting the mixture of the fraction enriched in the target substance and the viral inactivation solution in the reservoir;
so as to obtain a fraction depleted of active virus;
treating the fraction depleted of active virus by means of a separation (e.g. chromatography) step in the second separation unit; and
collecting a fraction more enriched in the target substance at the outlet of the second separation unit.

The viral inactivation step may further comprise a step of passing the fraction enriched in the target substance collected in the reservoir through the second separation unit via the bypass line. Preferably, this step is carried out simultaneously with the step of passing a viral inactivation solution (e.g. an acidic solution) through the second separation unit via the bypass line, with the fraction enriched in the target substance and the viral inactivation solution being mixed online in the second separation unit, in particular in the bypass line. At the outlet of the second separation unit, the mixture is then collected in the reservoir.

In other embodiments, the viral inactivation step does not comprise a step of passing the fraction enriched in the target substance collected in the reservoir through the second separation unit via the bypass line. In these embodiments, the fraction enriched in the target substance and the viral inactivation solution are mixed in the reservoir.

Other than using a single reservoir instead of a first and second reservoir, the purification method and installation using a single reservoir may be as described above with a first and second reservoir. In particular, the characteristics set forth above in relation to the first and second reservoir may apply to this single reservoir, alone or in combination.

The following embodiments provide a non-limiting illustration of the invention.

First Method for Purifying a Target Substance

With reference to FIG. 1, an installation for the implementation of the purification method may comprise:
- a multi-column chromatography system as a first separation unit 1, comprising for example two chromatography columns, preferably affinity columns;
- a second separation unit 2 comprising a chromatography column, preferably an ion exchange column; valves 8 that allow the fluid to be directed through the separation unit, either by passing it over the chromatography column or by bypassing the chromatography column (via the bypass line 9);
- a third separation unit 3 comprising a chromatography column, preferably an ion exchange column;
- a first reservoir 4;
- a second reservoir 5 comprising agitation means.

The second separation unit 2 preferably comprises several fluid inlets 10 and several fluid outlets 11.

It may comprise at least one fluid inlet for the fluid coming from the first reservoir (for the fraction enriched in the target substance), one fluid inlet for an acidic solution, one or more fluid inlets for a rinse buffer, one inlet for a basic solution, and/or one or more inlets for the fluid from the second reservoir (one inlet for the mixture of the fraction enriched in the target substance and the acidic solution, one inlet for the fraction depleted of active virus, and/or one inlet for the mixture of the fraction depleted of active virus and the basic solution).

It may comprise a fluid outlet for the fraction enriched in the target substance, an outlet for an acidic solution, an outlet for a basic solution, one or more outlets for a rinse buffer (including an outlet in fluid connection with a waste collection line), an outlet for the mixture of the fraction enriched in the target substance and the acidic solution, and/or an outlet for the mixture of the fraction depleted of active virus and the basic solution.

The aforementioned fluid inlets may all be different, or some of them may be the same. The same applies to the aforementioned fluid outlets.

Preferably, the installation used for the implementation of the first method comprises two fluid inlets for a rinse buffer, one fluid inlet for an acidic solution, one fluid inlet for a basic solution, one fluid inlet for the fraction enriched in the target molecule, one fluid inlet for the fraction depleted of active virus, and one fluid inlet for the mixture of the fraction enriched in the target substance and the acidic solution, as well as one fluid outlet for the rinse buffer, connected to a waste collection line, one fluid outlet for the mixture of the fraction enriched in the target substance and the acidic solution and for a rinse buffer, and one fluid outlet for the mixture of the fraction depleted of active virus and the basic solution.

According to this method, a fluid to be treated comprising a target substance undergoes a chromatography step in the first separation unit 1. Following this step, a fraction enriched in the target substance is collected in the first reservoir 4 until the first reservoir 4 is filled or until the volume collected reaches the volume that will be treated in the next step.

Figure 23:
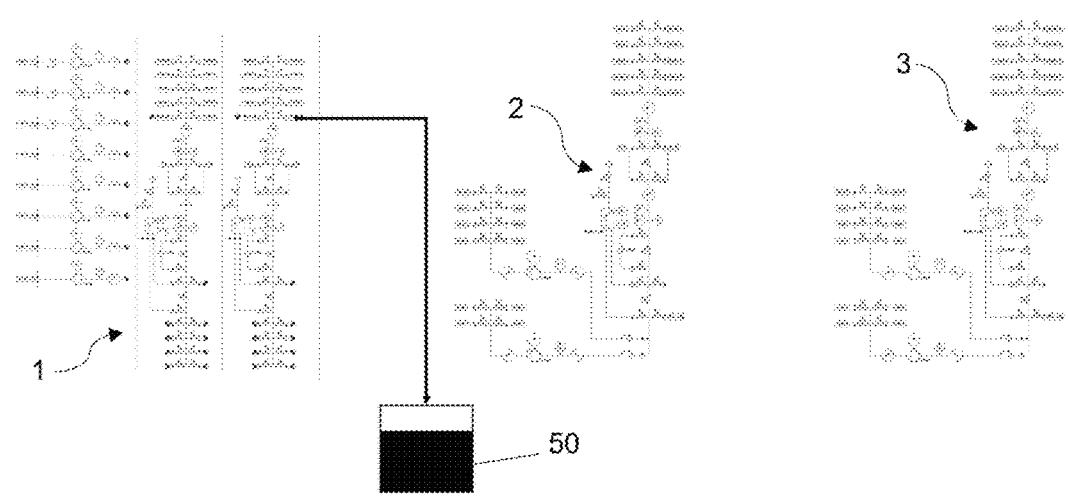
FIG. 23 shows one step of the purification method according to a first, second, and third embodiment using a single reservoir.

In other embodiments, a single reservoir 50 may be used in lieu of the first reservoir 4 and the second reservoir 5. In these embodiments, the step described with reference to FIG. 1 is carried out in the same way, except that the installation comprises a single reservoir 50 comprising agitation means, and the fraction enriched in the target substance is collected in the reservoir 50, as shown in FIG. 23.

Figure 2:
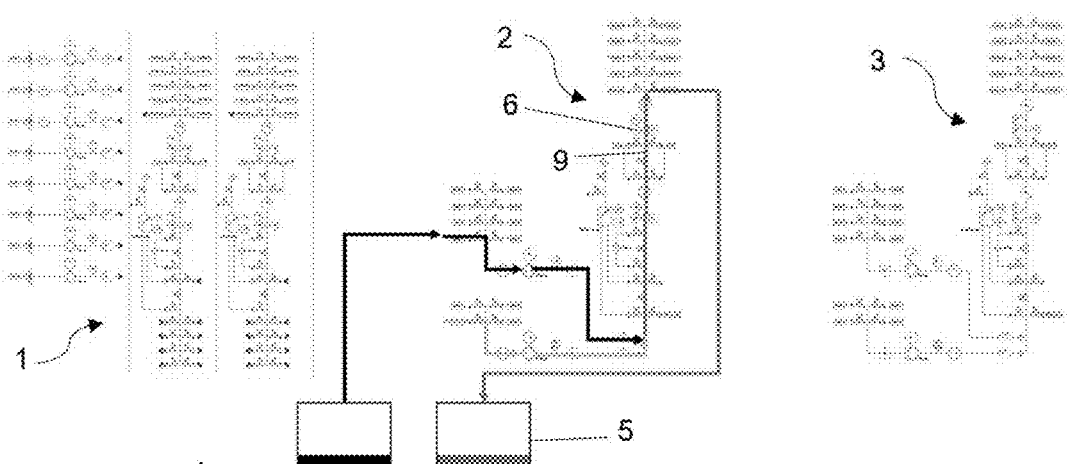
FIG. 2 shows another step of the purification method according to a first and second embodiment.

With reference to FIG. 2, in order to adjust the pH of the fraction enriched in the target substance contained in the first reservoir 4, said fraction and an acidic fraction are both simultaneously injected into the second separation unit 2 and pass through the bypass line 9, thus bypassing the chromatography column. The fraction enriched in the target substance and the acidic solution are mixed inside the second separation unit 2 (online mixing), in particular in the bypass line 9, and the mixture is collected in the second reservoir 5. This step may, for example, be carried out until the first reservoir 4 has been emptied. The pH of the mixture may be measured and controlled by reference to a target value by a sensor located in the second separation unit 2, e.g. the online pH sensor 6, and, optionally, by a sensor located in the second reservoir 5, and adjusted by modifying the flow rate and/or input volume of the acidic solution.

Figure 24:
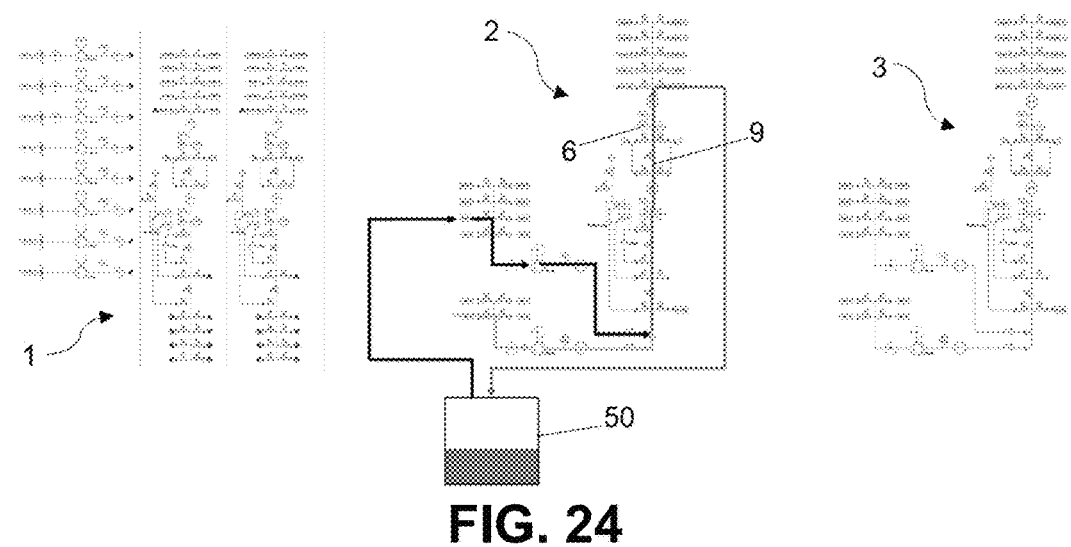
FIG. 24 shows another step of the purification method according to a first and second embodiment using a single reservoir.

In the embodiments in which a single reservoir 50 is used in lieu of the first reservoir 4 and the second reservoir 5, the step described with reference to FIG. 2 is carried out in the same manner, except that the reservoirs 4 and 5 are combined in a single reservoir 50, as shown in FIG. 24, and that, preferably, the reservoir 50 is not emptied. Thus, the fraction enriched in the target substance contained in the reservoir 50 following the chromatography step in the first separation unit 1 and the acidic solution are both simultaneously injected into the second separation unit 2, and pass through the bypass line 9, thus bypassing the chromatography column. The fraction enriched in the target substance and the acidic solution are mixed inside the second separation unit 2 (online mixing), in particular in the bypass line 9, and the mixture is collected in the reservoir 50.

Figure 3:
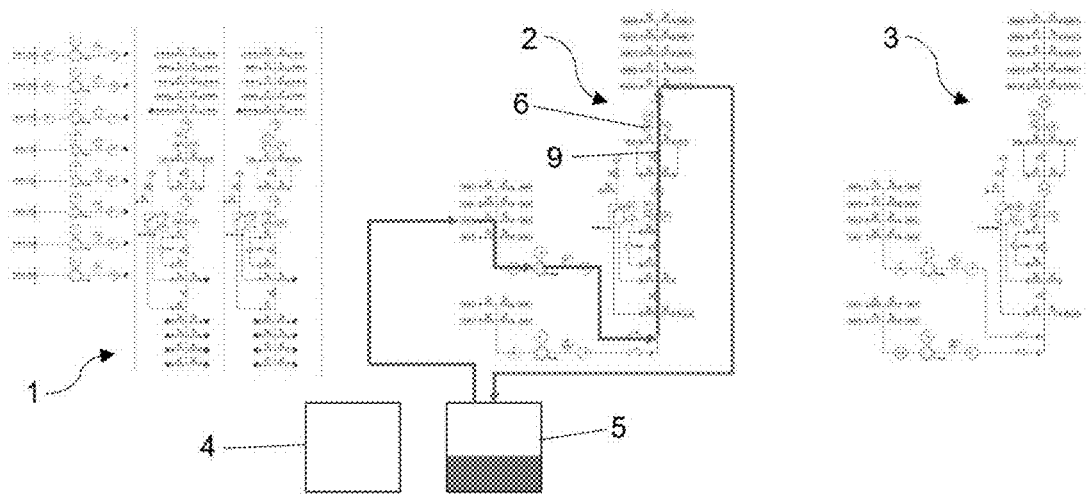
FIG. 3 shows another step of the purification method according to a first embodiment.

With reference to FIG. 3, the mixture collected in the second reservoir 5 is again passed through the second separation unit 2, and passes through the bypass line 9, the chromatography column being still bypassed, and is then collected again in the second reservoir 5. This step allows for the recovery of any portion of the fraction enriched in the target substance that may remain in the second separation unit 2 in the second reservoir 5, and for the homogenisation of the mixture. The pH of the mixture may be measured and controlled by reference to a target value by a sensor located in the second separation unit 2, e.g. the online pH sensor 6, and, optionally, by a sensor located in the second reservoir 5, and may be adjusted by modifying the flow rate and/or input volume of the acidic solution.

In the embodiments in which a single reservoir 50 is used in lieu of the first reservoir 4 and the second reservoir 5, the step described with reference to FIG. 3 is carried out in the same manner, except that the second reservoir 5 is replaced by the reservoir 50.

Figure 4:
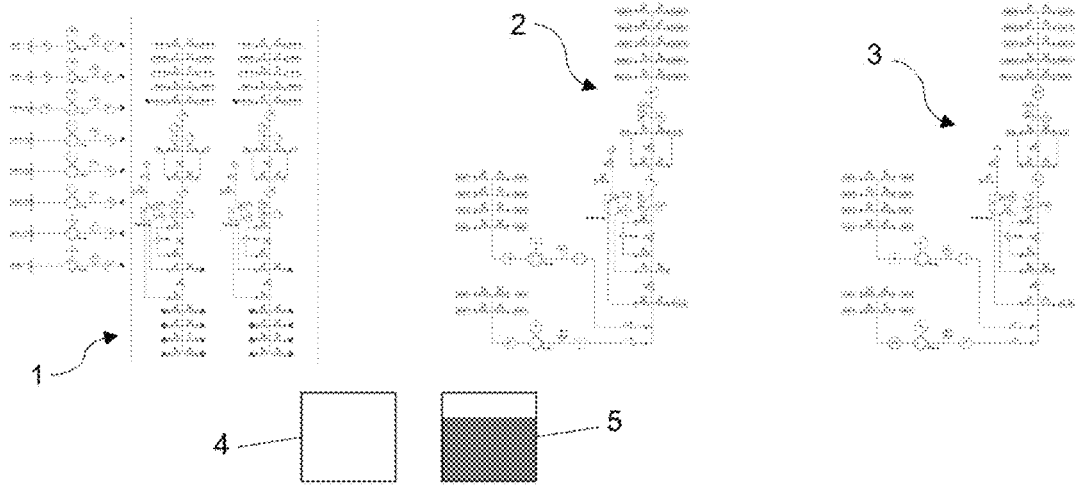
FIG. 4 shows another step of the purification method according to a first embodiment.

With reference to FIG. 4, the mixture is allowed to incubate, with agitation, for a certain duration, e.g. approximately 30 min, in the second reservoir 5, in order to carry out the viral inactivation. Thus, a fraction depleted of active virus is obtained. The pH of the mixture in the second reservoir 5 may be measured continuously by a sensor placed in the second reservoir 5.

In the embodiments in which a single reservoir 50 is used in lieu of the first reservoir 4 and the second reservoir 5, the step described with reference to FIG. 4 is carried out in the same manner, except that the second reservoir 5 is replaced by the reservoir 50.

Figure 5:
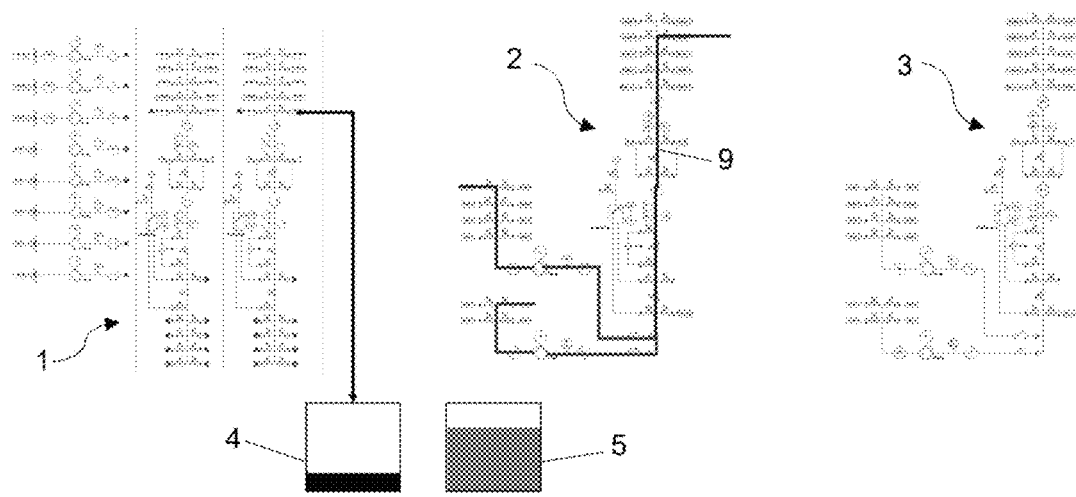
FIG. 5 shows another step of the purification method according to a first embodiment.

With reference to FIG. 5, a new flow of fluid to be treated undergoes a chromatography step in the first separation unit 1, and a new fraction enriched in the target substance is collected in the first reservoir 4 at the outlet of this chromatography step until the first reservoir 4 is filled or the volume collected reaches the volume that will be treated in the next step. At the same time, the second separation unit 2 is rinsed by passing a rinse buffer through the second separation unit 2 and, in particular, through the bypass line 9, the chromatography column being bypassed. The rinse buffer may, for example, be eliminated as waste at the outlet. Additionally or alternatively, at least part of the rinse buffer may be recovered in the second reservoir 5, the second separation unit 2 being in fluid communication with the second reservoir 5. This allows any mixture that may remain within the second separation unit 2 to be recovered in the second reservoir 5. The decision of whether to direct the rinse buffer, after its passage through the bypass line 9, to a waste collection line or towards the second reservoir 5 may be taken based on whether a desired pH or conductivity level has been reached, or a certain volume of rinse buffer has been passed, or based on timing.

Figure 6:
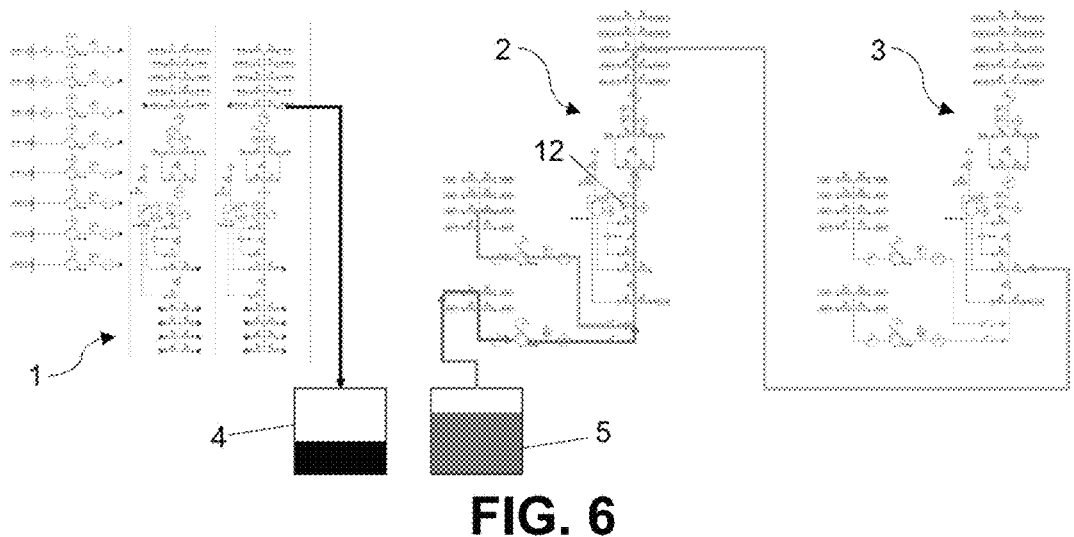
FIG. 6 shows another step of the purification method according to a first embodiment.

In the embodiments in which a single reservoir 50 is used in lieu of the first reservoir 4 and the second reservoir 5, the step described with reference to FIG. 5 is carried out in the same manner, except that the treatment of a new flow by a chromatography step in the first separation unit 1 is not carried out simultaneously with the rinsing step, but rather after the chromatographic treatment by the second separation unit 2 described with reference to FIG. 6, at the same time as the rinsing step described with reference to FIG. 7. With reference to FIG. 6, once the viral inactivation has been completed, in order to adjust the pH of the fraction depleted of active virus for its next treatment, that fraction and a basic solution are both simultaneously injected into the second separation unit 2 with the chromatography column being online (i.e. not bypassed). The fraction depleted of active virus and the basic solution are mixed within the second separation unit 2 (online mixing). The pH of the mixture may be measured and controlled by reference to a target value by a sensor located in the second separation unit 2, e.g. the online pH sensor 12, and adjusted by modifying the flow rate and/or input volume of the basic solution. The mixture is passed over the chromatography column of the second separation unit 2 in order to undergo a chromatography step. Following this chromatography step, a fraction more enriched in the target substance is recovered. This fraction is then directed to the third separation unit 3, in which it undergoes a chromatography step, and at the outlet of which a purified fraction is recovered. These steps are carried out, e.g., until the second reservoir 5 is empty.

In the embodiments in which a single reservoir 50 is used in lieu of the first reservoir 4 and the second reservoir 5, the step described with reference to FIG. 6 is carried out in the same manner, except that the second reservoir 5 is replaced by the reservoir 50.

Figure 7:
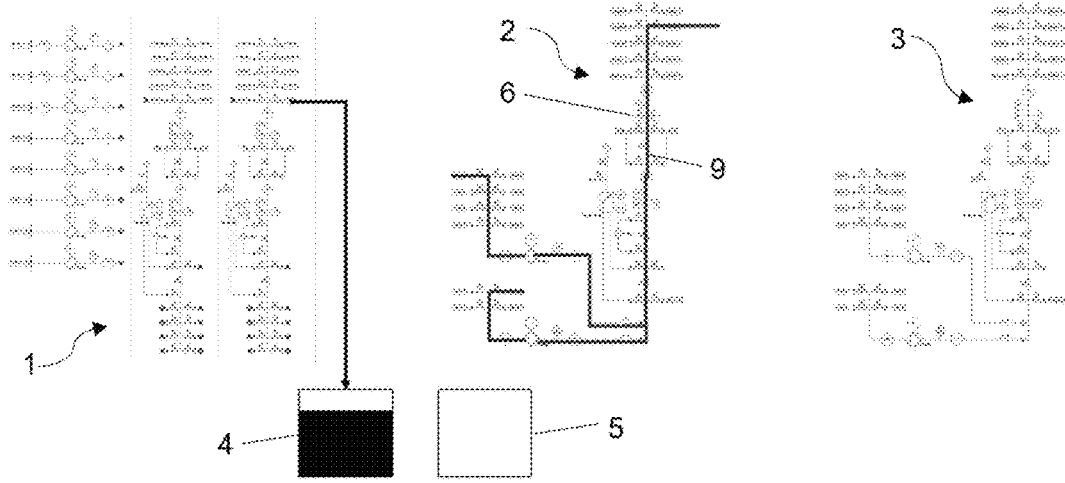
FIG. 7 shows another step of the purification method according to a first embodiment.

With reference to FIG. 7, rinsing is carried out by passing rinse buffer through the second separation unit 2, and, in particular, through the bypass line 9, the chromatography column being bypassed. The pH of the rinse buffer may be measured and controlled relative to a target value by a sensor located in the second separation unit 2, e.g. the online pH sensor 6. The flow rate and/or input volume of the rinse buffer may then be modified based on the measured pH.

Figure 25:
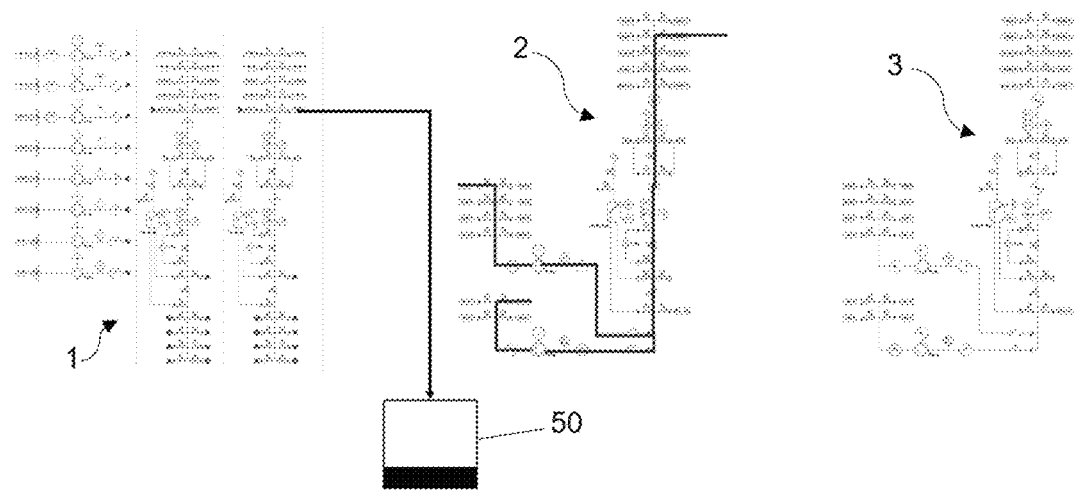
FIG. 25 shows another step of the purification method according to a first and second embodiment using a single reservoir.

In the embodiments in which a single reservoir 50 is used in lieu of the first reservoir 4 and the second reservoir 5, the step described with reference to FIG. 7 is carried out in the same manner, except that, at the same time, a new flow of fluid to be treated undergoes a chromatography step in the first separation unit 1, and a new fraction enriched in the target substance is collected in the reservoir 50 at the outlet of this chromatography step until the reservoir 50 is filled or the volume collected reaches the volume that will be treated in the next step, as shown in FIG. 25.

The cycle is then repeated starting from the step of adjusting the pH of the fraction enriched in the target substance contained in the first reservoir 4 with the acidic solution, as shown in FIG. 2, or in the embodiments in which a single reservoir 50 is used in lieu of the first reservoir 4 and the second reservoir 5, the cycle is repeated starting from the step of adjusting the pH of the fraction enriched in the target substance contained in the reservoir 50 with the acidic solution, as shown in FIG. 24.

Second Method for Purifying a Target Substance

The second purification method may use the same installation as described supra in reference to FIG. 1 and the first method.

Preferably, the installation used for the implementation of the second method comprises two fluid inlets for a rinse buffer, one fluid inlet for an acidic solution, one fluid inlet for a basic solution, one fluid inlet for the fraction enriched in the target molecule, one fluid inlet for the fraction depleted of active virus and for the mixture of the fraction depleted of active virus and the basic solution, and one fluid inlet for the mixture of the fraction enriched in the target substance and the acidic solution, as well as one fluid outlet for the rinse buffer, connected to a waste collection line, one fluid outlet for the mixture of the fraction enriched in the target substance and the acidic solution and for a rinse buffer, and one fluid outlet for the mixture of the fraction depleted of active virus and the basic solution.

According to this method, a fluid to be treated comprising a target substance undergoes a chromatography step in the first separation unit 1. Following this step, a fraction enriched in the target substance is collected in the first reservoir 4 until the first reservoir 4 is filled or until the volume collected reaches the volume that will be treated in the next step.

In other embodiments, a single reservoir 50 may be used in lieu of the first reservoir 4 and the second reservoir 5. In these embodiments, the step described with reference to FIG. 1 is carried out in the same way, except that the installation comprises a single reservoir 50 comprising agitation means, and the fraction enriched in the target substance is collected in the reservoir 50, as shown in FIG. 23.

With reference to FIG. 2, in order to adjust the pH of the fraction enriched in the target substance contained in the first reservoir 4, the latter and an acidic fraction are both simultaneously injected into the second separation unit 2 and pass through the bypass line 9, the chromatography column being bypassed. The fraction enriched in the target substance and the acidic solution are mixed inside the second separation unit 2 (online mixing), and the mixture is collected in the second reservoir 5. This step is carried out, for example, until the first reservoir 4 has been emptied. The pH of the mixture may be measured and controlled by reference to a target value by a sensor located in the second separation unit 2, e.g. the online pH sensor 6, and, optionally, by a sensor located in the second reservoir 5, and adjusted by modifying the flow rate and/or input volume of the acidic solution.

Figure 8:
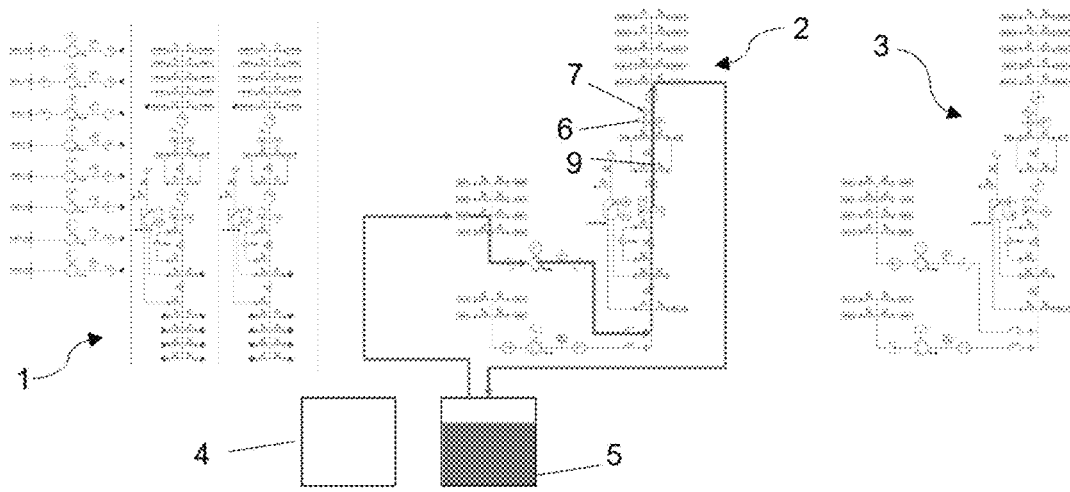
FIG. 8 shows another step of the purification method according to a second embodiment.

In the embodiments in which a single reservoir 50 is used in lieu of the first reservoir 4 and the second reservoir 5, the step described with reference to FIG. 2 is carried out in the same manner, except that the reservoirs 4 and 5 are combined in a single reservoir 50, as shown in FIG. 24, and that, preferably, the reservoir 50 is not emptied. Thus, the fraction enriched in the target substance contained in the reservoir 50 following the chromatography step in the first separation unit 1 and the acidic solution are both simultaneously injected into the second separation unit 2, and pass through the bypass line 9, the chromatography column being bypassed. The fraction enriched in the target substance and the acidic solution are mixed inside the second separation unit 2 (online mixing), in particular in the bypass line 9, and the mixture is collected in the reservoir 50. With reference to FIG. 8, the mixture collected in the second reservoir 5 is again passed through the second separation unit 2, and passes through the bypass line 9, the chromatography column being still bypassed, and is then collected again in the second reservoir 5. These steps (recirculation in the second separation unit 2 and collection in the second reservoir 5) are repeated or continuously carried out for a certain duration, e.g. app. 30 min, in order to carry out the viral inactivation. A fraction depleted of active virus is obtained. The pH and temperature of the mixture may be controlled upon each passage through the second separation unit 2 or continuously, as appropriate, using online pH 6 and temperature sensors 7. Thus, in the event that a deviation from a target pH and/or temperature value is measured, pH and/or temperature may be adjusted.

In the embodiments in which a single reservoir 50 is used in lieu of the first reservoir 4 and the second reservoir 5, the step described with reference to FIG. 8 is carried out in the same manner, except that the second reservoir 5 is replaced by the reservoir 50.

Figure 9:
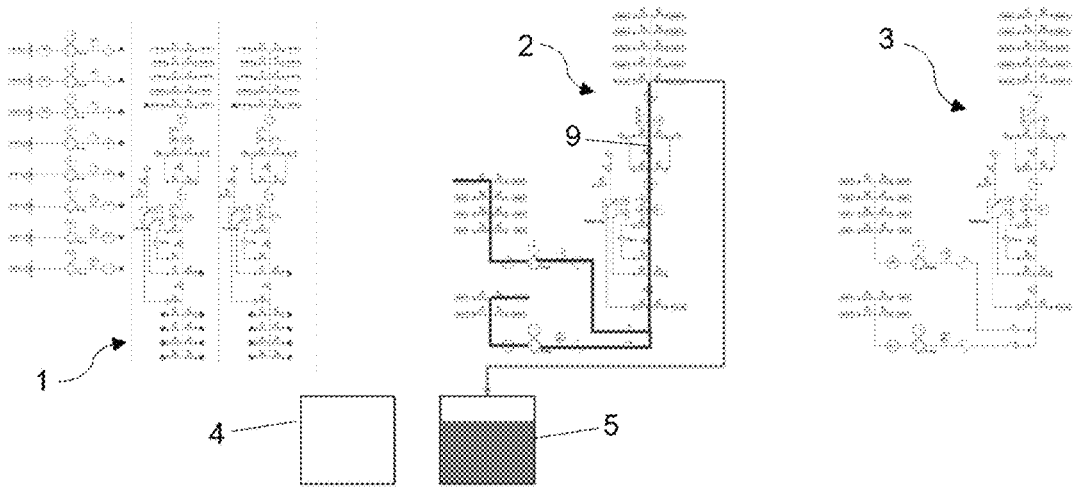
FIG. 9 shows another step of the purification method according to a second embodiment.

With reference to FIG. 9, a rinse buffer is then passed through the second separation unit 2, more specifically the bypass line 9, the chromatography column being bypassed, with the second separation unit 2 being in fluid communication with the second reservoir 5. This allows any mixture that may remain within the second separation unit 2 to be recovered in the second reservoir 5. Ideally, the volume of rinse buffer passed through the second separation unit 2 whilst it is in fluid communication with the second reservoir 5 is greater than the internal volume of the pipes of the second separation unit 2.

In the embodiments in which a single reservoir 50 is used in lieu of the first reservoir 4 and the second reservoir 5, the step described with reference to FIG. 9 is carried out in the same manner, except that the second reservoir 5 is replaced by the reservoir 50.

Figure 10:
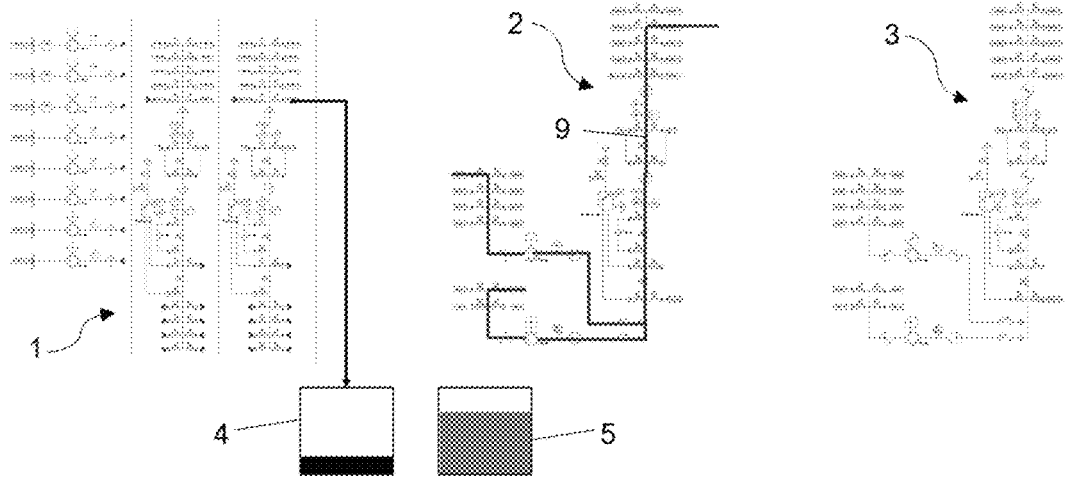
FIG. 10 shows another step of the purification method according to a second embodiment.

With reference to FIG. 10, a new flow of fluid to be treated undergoes a chromatography step in the first separation unit 1, and a new fraction enriched in the target substance is collected in the first reservoir 4 at the outlet of this chromatography step until the first reservoir 4 is filled or the volume collected reaches the volume that will be treated in the next step. At the same time, the second separation unit 2 is rinsed by passing the rinse buffer through the second separation unit 2, in particular the bypass line 9, the chromatography column being bypassed, and the second separation unit not being in fluid communication with the second reservoir 5, but rather with a waste collection line. The decision of whether to direct the rinse buffer, after its passage through the bypass line 9, to a waste collection line or towards the second reservoir 5 may be taken based on whether a desired pH or conductivity level has been reached, or a certain volume of rinse buffer has been passed, or based on timing.

In the embodiments in which a single reservoir 50 is used in lieu of the first reservoir 4 and the second reservoir 5, the step described with reference to FIG. 10 is carried out in the same manner, except that the treatment of a new flow by a chromatography step in the first separation unit 1 is not carried out simultaneously with the rinsing step, but rather after the chromatographic treatment by the second separation unit 2 described with reference to FIG. 13, at the same time as the rinsing step described with reference to FIG. 14.

Figure 11:
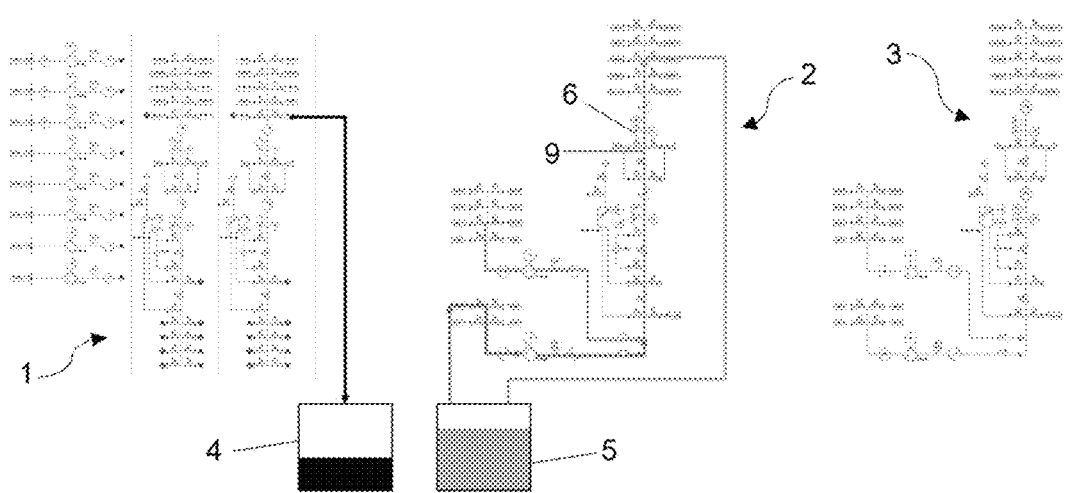
FIG. 11 shows another step of the purification method according to a second embodiment.

In reference to FIG. 11, in order to adjust the pH of the fraction depleted of active virus for its next treatment, that fraction and a basic solution are both simultaneously injected into the second separation unit 2 and pass through the bypass line 9, the chromatograph column being bypassed, and the second separation unit 2 being in fluid communication with the second reservoir 5. The fraction depleted of active virus and the basic solution are mixed inside the second separation unit 2 (online mixing), and the mixture is collected in the second reservoir 5. The pH of the mixture may be measured and controlled by reference to a target value by a sensor located in the second separation unit 2, e.g. the online pH sensor 6, and, optionally, by a sensor located in the second reservoir 5, and adjusted by modifying the flow rate and/or input volume of the basic solution. The mixture collected in the second reservoir 5 may optionally be again passed through the second separation 2, the chromatography column being bypassed, and collected again in the second reservoir, one or more times or continuously. This allows the pH of the mixture to be controlled or recontrolled, e.g. using an online pH sensor 6, and to adjust it precisely before the next chromatography treatment.

In the embodiments in which a single reservoir 50 is used in lieu of the first reservoir 4 and the second reservoir 5, the step described with reference to FIG. 11 is carried out in the same manner, except that the second reservoir 5 is replaced by the reservoir 50.

Figure 12:
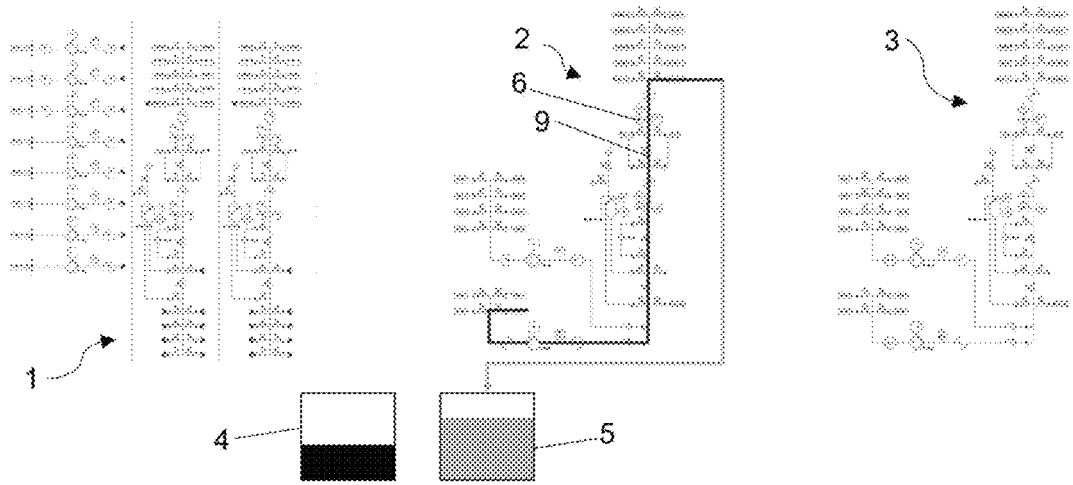
FIG. 12 shows another step of the purification method according to a second embodiment.

In reference to FIG. 12, a rinse buffer is then passed through the second separation unit 2, through the bypass line 9, the chromatography column being bypassed, with the second separation unit 2 being in fluid communication with the second reservoir 5. This allows any mixture that may remain within the second separation unit 2 to be recovered in the second reservoir 5. The pH of the rinse buffer may be measured and controlled relative to a target value by a sensor located in the second separation unit 2, e.g. the online pH sensor 6. The flow rate and/or input volume of the rinse buffer may then be modified depending on the measured pH.

In the embodiments in which a single reservoir 50 is used in lieu of the first reservoir 4 and the second reservoir 5, the step described with reference to FIG. 12 is carried out in the same manner, except that the second reservoir 5 is replaced by the reservoir 50.

Figure 13:
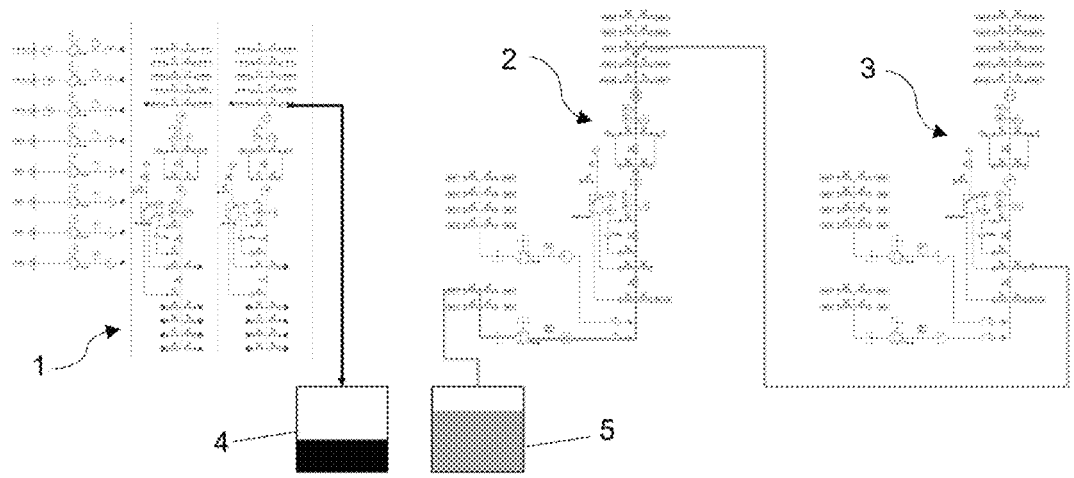
FIG. 13 shows another step of the purification method according to a second embodiment.

In reference to FIG. 13, the mixture contained in the second reservoir 5 is passed through the second separation unit 2, including through the online chromatography column, in order to undergo a chromatography step. Following this chromatography step, a fraction more enriched in the target substance is recovered. This fraction is then supplied to the third separation unit 3, in which it undergoes a chromatography step, at the outlet of which a purified fraction is recovered. These steps are carried out, e.g., until the second reservoir 5 is empty.

In the embodiments in which a single reservoir 50 is used in lieu of the first reservoir 4 and the second reservoir 5, the step described with reference to FIG. 13 is carried out in the same manner, except that the second reservoir 5 is replaced by the reservoir 50.

Figure 14:
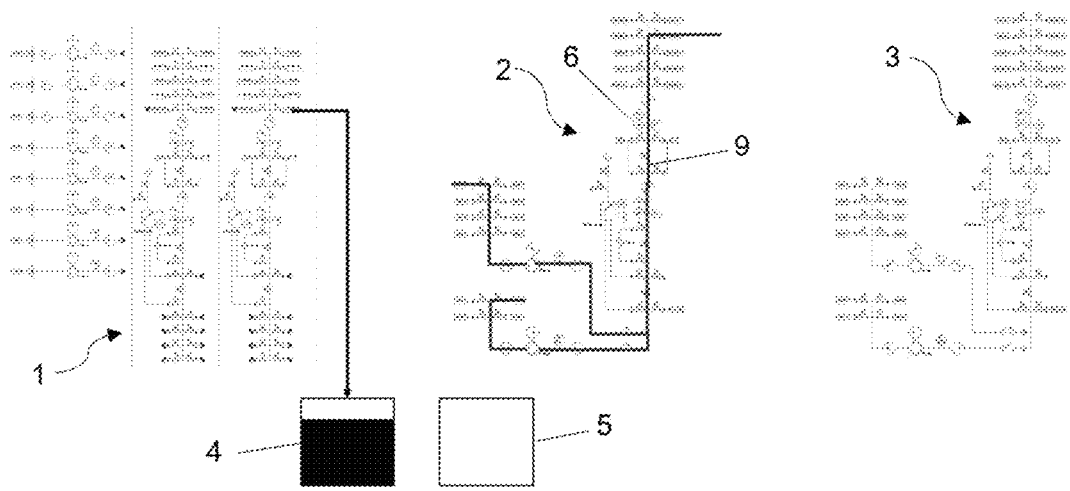
FIG. 14 shows another step of the purification method according to a second embodiment.

With reference to FIG. 14, rinsing is carried out by passing rinse buffer through the second separation unit 2, and, in particular, through the bypass line 9, the chromatography column being bypassed. The pH of the rinse buffer may be measured and controlled by reference to a target value by a sensor located in the second separation unit 2, e.g. the online pH sensor 6. The flow rate and/or input volume of the rinse buffer may then be modified depending on the measured pH.

In the embodiments in which a single reservoir 50 is used in lieu of the first reservoir 4 and the second reservoir 5, the step described with reference to FIG. 14 is carried out in the same manner, except that, at the same time, a new flow of fluid to be treated undergoes a chromatography step in the first separation unit 1, and a new fraction enriched in the target substance is collected in the reservoir 50 at the outlet of this chromatography step until the reservoir 50 is filled or the volume collected reaches the volume that will be treated in the next step, as shown in FIG. 25.

The cycle is then repeated starting from the step of adjusting the pH of the fraction enriched in the target substance contained in the first reservoir 4 with the acidic solution, as shown in FIG. 2, or in the embodiments in which a single reservoir 50 is used in lieu of the first reservoir 4 and the second reservoir 5, the cycle is repeated starting from the step of adjusting the pH of the fraction enriched in the target substance contained in the reservoir 50 with the acidic solution, as shown in FIG. 24.

Third Method for Purifying a Target Substance

The third purification method may use the same installation as described supra in reference to FIG. 1 and the first method.

Preferably, the installation used for the implementation of the second method comprises two fluid inlets for a rinse buffer, one fluid inlet for an acidic solution, one fluid inlet for a basic solution, one fluid inlet for the fraction enriched in the target molecule, and one fluid inlet for the mixture of the fraction depleted of active virus and the basic solution, as well as one fluid outlet for the rinse buffer, connected to a waste collection line, a fluid outlet for the fraction enriched in the target substance, for an acidic solution, and for a basic solution, and a fluid outlet for the mixture of the fraction depleted of active virus and the basic solution.

According to this method, a fluid to be treated comprising a target substance undergoes a chromatography step in the first separation unit 1. Following this step, a fraction enriched in the target substance is collected in the first reservoir 4 until the first reservoir 4 is filled or until the volume collected reaches the volume that will be treated in the next step.

In other embodiments, a single reservoir 50 may be used in lieu of the first reservoir 4 and the second reservoir 5. In these embodiments, the step described with reference to FIG. 1 is carried out in the same way, except that the installation comprises a single reservoir 50 comprising agitation means, and the fraction enriched in the target substance is collected in the reservoir 50, as shown in FIG. 23, and that, preferably, the installation comprises neither fluid inlets nor fluid outlets for the fraction enriched in the target substance.

Figure 15:
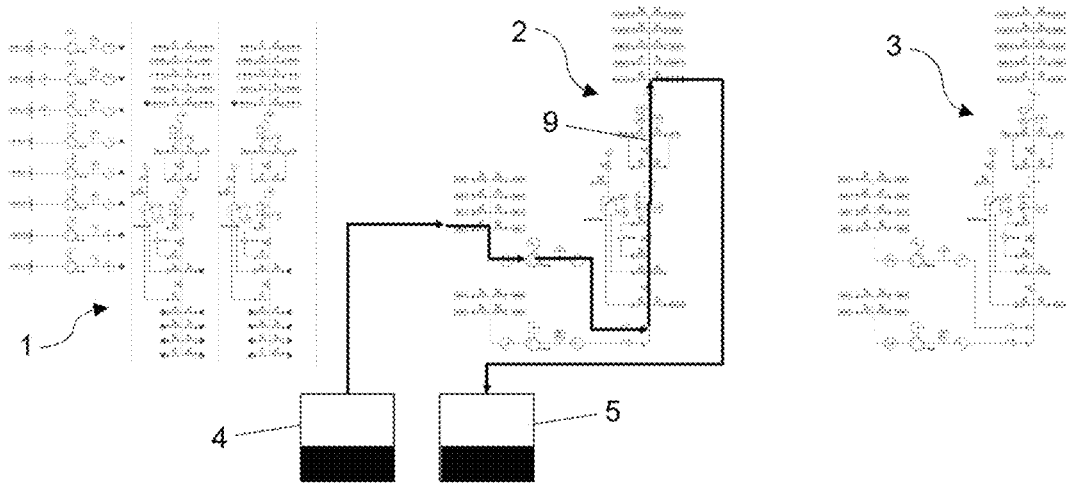
FIG. 15 shows another step of the purification method according to a third embodiment.

In reference to FIG. 15, the fraction enriched in the target substance contained in the first reservoir 4 is passed through the second separation unit 2, passing through the bypass line 9, the chromatography column being bypassed and the second separation unit 2 being in fluid communication with the second reservoir 5, and is collected in the second reservoir 5.

In the embodiments in which a single reservoir 50 is used in lieu of the first reservoir 4 and the second reservoir 5, the step described with reference to FIG. 15 is not carried out.

Figure 16:
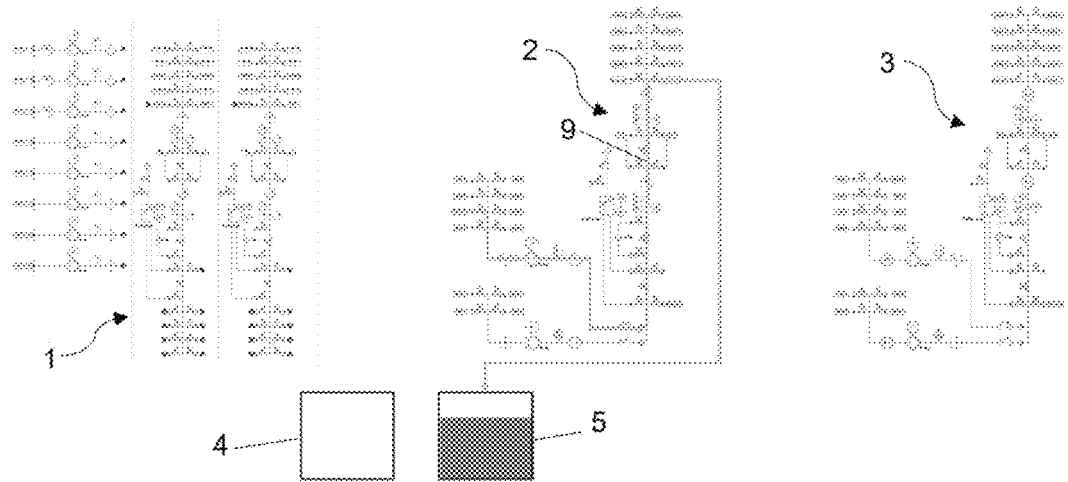
FIG. 16 shows another step of the purification method according to a third embodiment.

In reference to FIG. 16, in order to adjust the pH of the fraction enriched in the target substance contained in the second reservoir 5, an acidic solution is passed through the second separation unit 2, passing through the bypass line 9, the chromatography column being bypassed and the second separation unit 2 being in fluid communication with the second reservoir 5. The acidic solution is mixed in the second reservoir 5 with the fraction enriched in the target substance contained in the second reservoir 5 using the agitation means of the second reservoir 5. The pH of the mixture may be measured and controlled by reference to a target value by a pH sensor located in the second reservoir 5, and adjusted by modifying the flow rate and/or input volume of the acidic solution.

In the embodiments in which a single reservoir 50 is used in lieu of the first reservoir 4 and the second reservoir 5, the step described with reference to FIG. 16 is carried out in the same manner, except that the second reservoir 5 is replaced by the reservoir 50.

Figure 17:
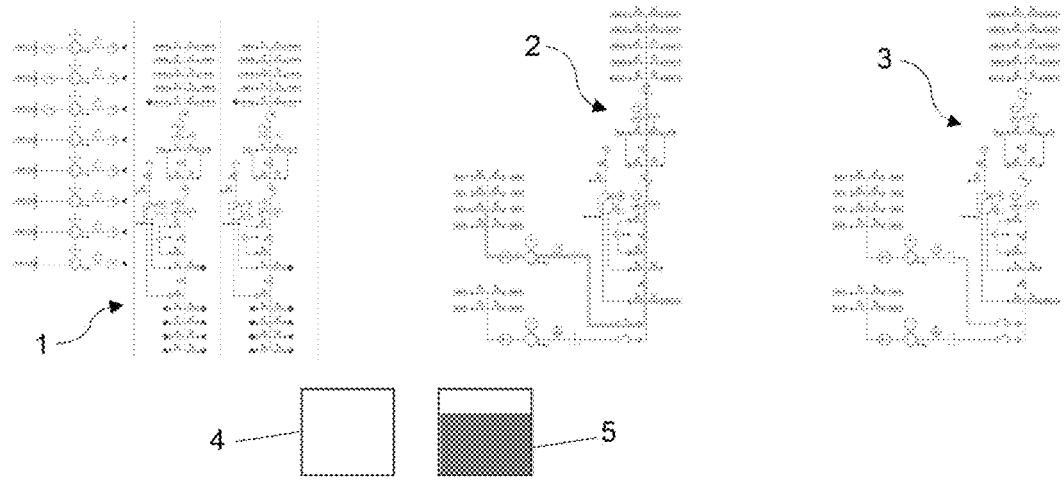
FIG. 17 shows another step of the purification method according to a third embodiment.

With reference to FIG. 17, the mixture is allowed to incubate, with agitation, for a certain duration, e.g. approximately 30 min, in the second reservoir 5, in order to carry out the viral inactivation. Thus, a fraction depleted of active virus is obtained.

In the embodiments in which a single reservoir 50 is used in lieu of the first reservoir 4 and the second reservoir 5, the step described with reference to FIG. 17 is carried out in the same manner, except that the second reservoir 5 is replaced by the reservoir 50.

Figure 18:
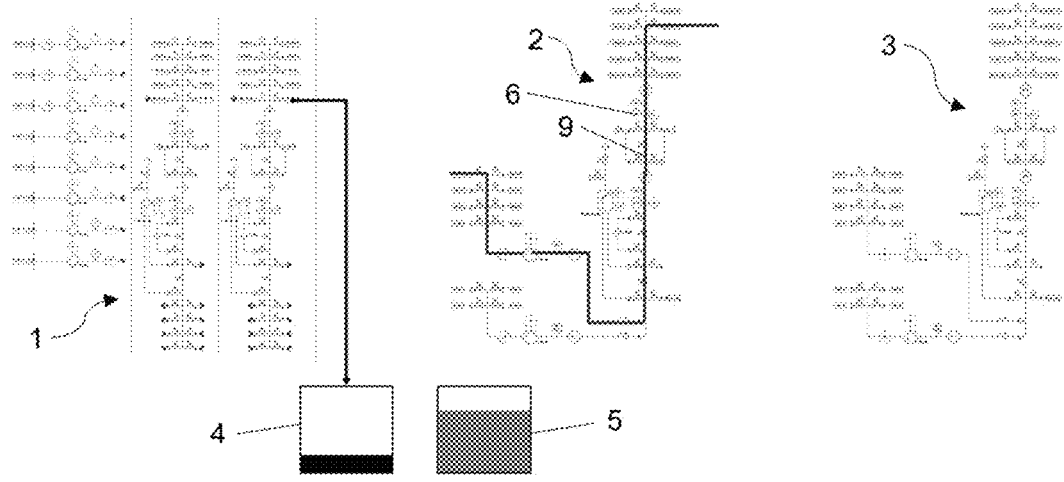
FIG. 18 shows another step of the purification method according to a third embodiment.

With reference to FIG. 18, a new flow of fluid to be treated undergoes a chromatography step in the first separation unit 1, and a new fraction enriched in the target substance is collected in the first reservoir 4 at the outlet of this chromatography step until the first reservoir 4 is filled or the volume collected reaches the volume that will be treated in the next step. At the same time, the second separation unit 2 is rinsed by passing rinse buffer through the second separation unit 2 and passing through the bypass line 9, the chromatography column being bypassed. The rinse buffer carrying the acidic solution remaining in the circuit may then be eliminated as waste at the outlet. The pH of the rinse buffer may be measured and controlled relative to a target value by a sensor located in the second separation unit 2, e.g. the online pH sensor 6. The flow rate and/or input volume of the rinse buffer may then be modified depending on the measured pH.

In the embodiments in which a single reservoir 50 is used in lieu of the first reservoir 4 and the second reservoir 5, the step described with reference to FIG. 18 is carried out in the same manner, except that the treatment of a new flow by a chromatography step in the first separation unit 1 is not carried out simultaneously with the rinsing step, but rather after the chromatographic treatment by the second separation unit 2 described with reference to FIG. 21, at the same time as the rinsing step described with reference to FIG. 22.

Figure 19:
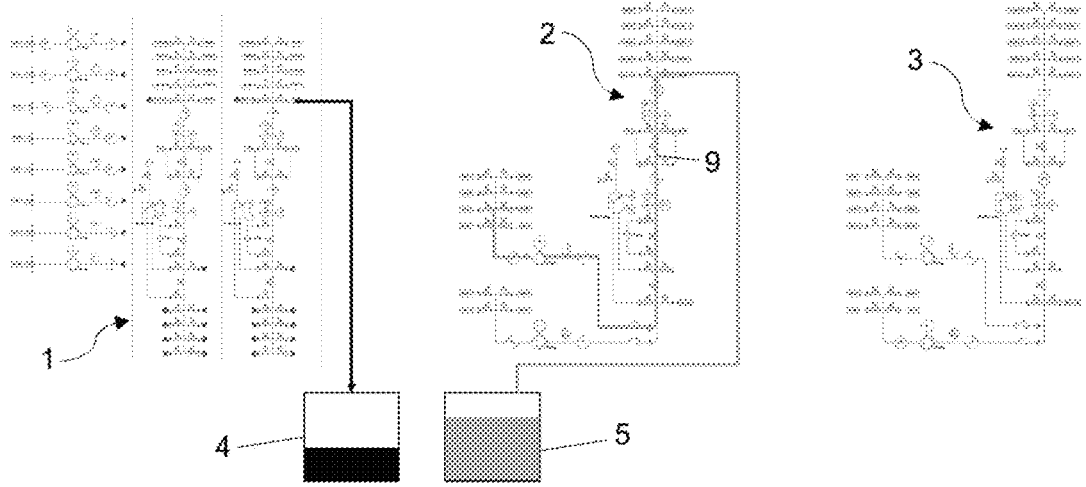
FIG. 19 shows another step of the purification method according to a third embodiment.

In reference to FIG. 19, in order to adjust the pH of the fraction depleted of active virus for its next treatment, a basic solution is passed through the second separation unit 2, passing through the bypass line 9, the chromatograph column being bypassed and the second separation unit 2 being in fluid communication with the second reservoir 5. The basic solution is mixed in the second reservoir 5 with the fraction depleted of active virus contained in the second reservoir 5 using the agitation means of the second reservoir 5. The pH of the mixture may be measured and controlled by reference to a target value by a pH sensor located in the second reservoir 5, and adjusted by modifying the flow rate and/or input volume of the basic solution.

In the embodiments in which a single reservoir 50 is used in lieu of the first reservoir 4 and the second reservoir 5, the step described with reference to FIG. 19 is carried out in the same manner, except that the second reservoir 5 is replaced by the reservoir 50.

Figure 20:
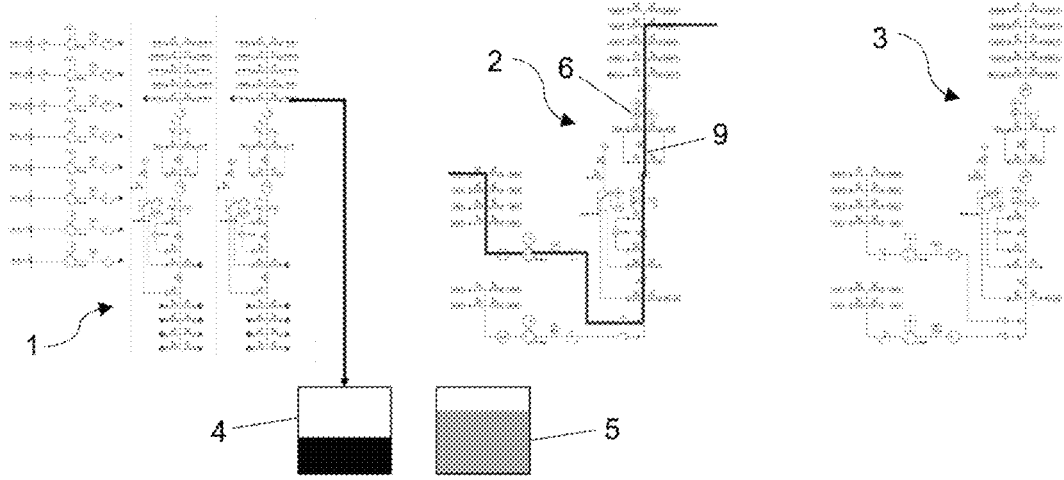
FIG. 20 shows another step of the purification method according to a third embodiment.

With reference to FIG. 20, rinsing is carried out by passing rinse buffer through the second separation unit 2, and passing through the bypass line 9, the chromatography column being bypassed. The rinse buffer carrying the basic solution remaining in the circuit may then be eliminated as waste at the outlet. The pH of the rinse buffer may be measured and controlled relative to a target value by a sensor located in the second separation unit 2, e.g. the online pH sensor 6. The flow rate and/or input volume of the rinse buffer may then be modified depending on the measured pH.

In the embodiments in which a single reservoir 50 is used in lieu of the first reservoir 4 and the second reservoir 5, the step described with reference to FIG. 20 is carried out in the same manner, except that the second reservoir 5 is replaced by the reservoir 50.

Figure 21:
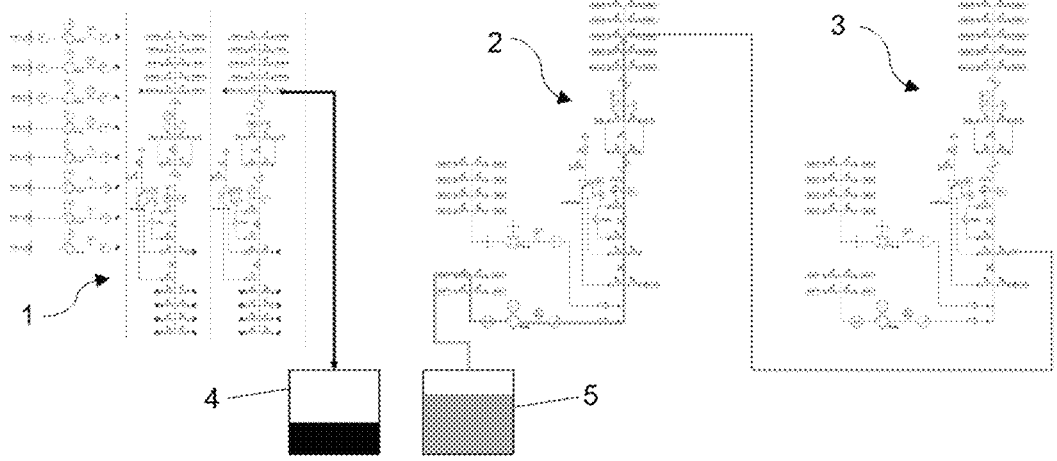
FIG. 21 shows another step of the purification method according to a third embodiment.

In reference to FIG. 21, the mixture contained in the second reservoir 5 is passed through the second separation unit 2, including the chromatography column that is online, in order to undergo a chromatography step therein. Following this chromatography step, a fraction more enriched in the target substance is recovered. This fraction is then supplied to the third separation unit 3, in which it undergoes a chromatography step, and at the outlet of which a purified fraction is recovered. These steps are carried out, e.g., until the second reservoir 5 is empty.

In the embodiments in which a single reservoir 50 is used in lieu of the first reservoir 4 and the second reservoir 5, the step described with reference to FIG. 21 is carried out in the same manner, except that the second reservoir 5 is replaced by the reservoir 50.

Figure 22:
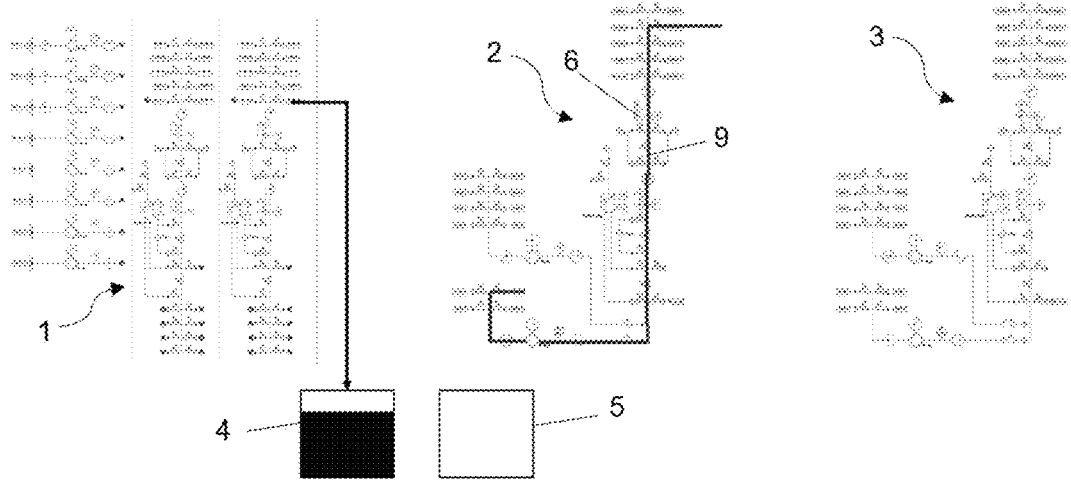
FIG. 22 shows another step of the purification method according to a third embodiment.

With reference to FIG. 22, rinsing is carried out by passing rinse buffer through the second separation unit 2, and passing through the bypass line 9, the chromatography column being bypassed. The rinse buffer carrying the mixture remaining in the circuit may then be eliminated as waste at the outlet. The pH of the rinse buffer may be measured and controlled relative to a target value by a sensor located in the second separation unit 2, e.g. the online pH sensor 6. The flow rate and/or input volume of the rinse buffer may then be modified depending on the measured pH.

In the embodiments in which a single reservoir 50 is used in lieu of the first reservoir 4 and the second reservoir 5, the step described with reference to FIG. 22 is carried out in the same manner, except that, at the same time, a new flow of fluid to be treated undergoes a chromatography step in the first separation unit 1, and a new fraction enriched in the target substance is collected in the reservoir 50 at the outlet of this chromatography step until the reservoir 50 is filled or the volume collected reaches the volume that will be treated in the next step.

The cycle is then repeated starting from the step of passing the fraction enriched in the target substance contained in the first reservoir 4 to the second reservoir 5 through the second separation unit 2, as shown in FIG. 15, or in the embodiments in which a single reservoir 50 is used in lieu of the first reservoir 4 and the second reservoir 5, the cycle is repeated starting from the step of passing the acidic solution through the second separation unit 2 via the bypass line 9.

Computer Program

Another object of the invention consists of a computer program comprising program code instructions for executing the steps of the method according to the invention when the program is run on a computer.

The invention also concerns a computer-readable storage medium on which a computer program as described above is stored.

The invention also concerns a system comprising a processor coupled to a memory on which a computer program as described above is stored. The system may also comprise the installation as described above or be solely a control system that is connected to the installation and distinct from it.

The invention claimed is:

1. A method for purifying a target substance from a fluid to be treated comprising at least one impurity, in an installation comprising:
   a first separation unit comprising at least a chromatography column, a fluid inlet, and a fluid outlet;
   a second separation unit comprising at least one or more chromatography columns, one or more fluid inlets, one or more fluid outlets, and a bypass line, the bypass line being connected to at least one fluid inlet of the second separation unit at a first end of the bypass line and connected to at least one fluid outlet of the second separation unit at a second end of the bypass line, the bypass line bypassing each of the chromatography columns of the second separation unit;
   a first reservoir in fluid connection with a fluid outlet of the first separation unit and a fluid inlet of the second separation unit; and
   a second reservoir in fluid connection with at least a fluid inlet and a fluid outlet of the second separation unit;
   wherein the method comprises the following steps:
      providing a flow of fluid to be treated;
      treating the flow of fluid to be treated by means of a chromatography step in the first separation unit;
      collecting a fraction enriched in the target substance in the first reservoir;
      viral inactivation of the fraction enriched in the target substance, wherein the viral inactivation comprises:
         passing the fraction enriched in the target substance collected in the first reservoir through the second separation unit via the bypass line;
         passing a viral inactivation solution through the second separation unit via the bypass line;
         mixing the fraction enriched in the target substance and the viral inactivation solution; and
         collecting the mixture of the fraction enriched in the target substance and the viral inactivation solution in the second reservoir;
      so as to obtain a fraction depleted of active virus;
      treating the fraction depleted of active virus by means of a chromatography step in the second separation unit; and
      collecting a fraction more enriched in the target substance at the outlet of the second separation unit.

2. The method according to claim 1, wherein the treatment of the flow of fluid to be treated by means of a chromatography step in the first separation unit is an affinity chromatography treatment.

3. The method according to claim 1, wherein the treatment of the fraction depleted of active virus by means of a chromatography step in the second separation unit is a treatment by ion exchange chromatography.

4. The method according to claim 1, wherein the step of passing the fraction enriched in the target substance collected in the first reservoir through the second separation unit via the bypass line and the step of passing a viral inactivation solution through the second separation unit via the bypass line are:
   simultaneous, wherein the step of mixing the fraction enriched in the target substance and the viral inactivation solution is carried out online in the bypass line of the second separation unit; or
   successive, wherein the step of mixing the fraction enriched in the target substance and the viral inactivation solution is carried out in the second reservoir.

5. The method according to claim 1, wherein the mixture of the fraction enriched in the target substance and the viral inactivation solution collected in the second reservoir is stored in the second reservoir for at least 15 min.

6. The method according to claim 1, wherein the viral inactivation of the fraction enriched in the target substance further comprises:
   a) passing the mixture of fraction enriched in the target substance and viral inactivation solution collected in the second reservoir through the second separation unit via the bypass line;
   b) collecting the mixture at the outlet of the second separation unit in the second reservoir;
   wherein steps a) and b) are optionally repeated one or more times or carried out continuously; and
   c) optionally storing the mixture in the second reservoir;
   wherein the steps a) and b), which are optionally repeated or optionally carried out continuously, and the optional step c) taken together are carried out for a duration of at least 15 min.

7. The method according to claim 1, wherein the second separation unit further comprises a pH sensor and/or a temperature sensor, wherein the viral inactivation of the fraction enriched in the target substance further comprises measuring and optionally adjusting the pH and/or temperature of the mixture of the fraction enriched in the target substance and the viral inactivation solution passing through the second separation unit.

8. The method according to claim 1, wherein the viral inactivation solution is an acidic solution.

9. The method according to claim 8, wherein the mixture of the fraction enriched in the target substance and the acidic solution has a pH less than or equal to 5.

10. The method according to claim 8, comprising a step of adding a basic solution to the fraction depleted of active virus before the step of treating the fraction depleted of active virus by means of a chromatography step in the second separation unit.

11. The method according to claim 10, wherein the addition of the basic solution to the fraction depleted of active virus is carried out online in the second separation unit or is carried out in the second reservoir.

12. The method according to claim 1, comprising at least one step of rinsing the second separation unit, wherein a rinse buffer is passed through the second separation unit via the bypass line, after the step of viral inactivation of the fraction enriched in the target substance, and/or before the step of treating the fraction depleted of active virus by means of a chromatography step in the second separation unit, and/or after the step of treating the fraction depleted of active virus by means of a chromatography step in the second separation unit.

13. The method according to claim 1, wherein the installation further comprises a third separation unit comprising at least a chromatography column, a fluid inlet and a fluid outlet, wherein a fluid inlet is in fluid connection with a fluid outlet of the second separation unit;
wherein the method further comprises the following steps:
treating the fraction more enriched in the target substance by means of a chromatography step in the third separation unit; and
collecting a purified fraction of the target substance at the outlet of the third separation unit.

14. The method according to claim 13, wherein the treatment of the fraction more enriched in the target substance by means of a chromatography step in the third separation unit is a treatment by ion exchange chromatography.

15. The method according to claim 1, wherein the fluid to be treated is a cell culture supernatant.

16. The method according to claim 1, wherein the target substance is an antibody.

17. The method according to claim 1, wherein the first separation unit is a multi-column unit.

\* \* \* \* \*